(12) United States Patent
Sawada et al.

(10) Patent No.: US 10,710,463 B2
(45) Date of Patent: Jul. 14, 2020

(54) CONTROL DEVICE FOR ELECTRIC VEHICLE AND CONTROL METHOD FOR ELECTRIC VEHICLE

(71) Applicant: NISSAN MOTOR CO., LTD., Yokohama-shi, Kanagawa (JP)

(72) Inventors: Akira Sawada, Kanagawa (JP); Ken Itou, Kanagawa (JP); Takashi Nakajima, Kanagawa (JP); Yuji Katsumata, Kanagawa (JP); Hiroyuki Komatsu, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 296 days.

(21) Appl. No.: 15/576,455

(22) PCT Filed: May 26, 2015

(86) PCT No.: PCT/JP2015/065144
§ 371 (c)(1),
(2) Date: Nov. 22, 2017

(87) PCT Pub. No.: WO2016/189670
PCT Pub. Date: Dec. 1, 2016

(65) Prior Publication Data
US 2018/0154797 A1  Jun. 7, 2018

(51) Int. Cl.
*B60L 15/20* (2006.01)
*B60W 30/18* (2012.01)
(Continued)

(52) U.S. Cl.
CPC ............. *B60L 15/2072* (2013.01); *B60L 7/26* (2013.01); *B60L 15/20* (2013.01);
(Continued)

(58) Field of Classification Search
CPC combination set(s) only.
See application file for complete search history.

(56) References Cited

U.S. PATENT DOCUMENTS

| 8,712,613 B2 * | 4/2014 | Yoshida | B60K 6/48 701/22 |
| 2001/0025220 A1 * | 9/2001 | Kaneko | B60K 6/485 701/112 |

(Continued)

FOREIGN PATENT DOCUMENTS

| EP | 1 052 401 A2 | 11/2000 |
| JP | 05-168108 A | 7/1993 |

(Continued)

OTHER PUBLICATIONS

Abstract and English translation of JP 2013-223373, family member of WO 2013/157313.

*Primary Examiner* — P. E. Yuri Kan
(74) *Attorney, Agent, or Firm* — Foley & Lardner LLP

(57) ABSTRACT

The control device for the electric vehicle determines whether or not the starting operation of the vehicle has been performed by the driver, calculates the disturbance torque estimated value Td necessary for maintaining the vehicle stop state corresponding to the disturbance acting on the vehicle, and performs a control such that the driving torque of the motor converges to the disturbance torque estimated value Td when the vehicle is determined to be just before stop of the vehicle during running or determined to have undergone the starting operation. Then, the control device for the electric vehicle controls the responsiveness of the driving torque to the disturbance acting on the vehicle, and increases the responsiveness of the driving torque of the motor compared with the responsiveness of the driving torque just before stop of the vehicle when the starting operation is determined to have been performed.

12 Claims, 14 Drawing Sheets

(51) Int. Cl.
*B60K 6/48* (2007.10)
*B60K 6/485* (2007.10)
*B60K 6/445* (2007.10)
*B60L 7/26* (2006.01)

(52) U.S. Cl.
CPC ....... *B60L 15/2009* (2013.01); *B60L 15/2018* (2013.01); *B60L 2240/423* (2013.01); *B60L 2250/28* (2013.01); *B60L 2260/22* (2013.01); *B60L 2260/26* (2013.01); *Y02T 10/645* (2013.01); *Y02T 10/7275* (2013.01)

(56) References Cited

U.S. PATENT DOCUMENTS

| | | | | |
|---|---|---|---|---|
| 2005/0284679 | A1* | 12/2005 | Hommi | B60K 6/445 180/197 |
| 2006/0017414 | A1* | 1/2006 | Joe | B60K 6/445 318/432 |
| 2012/0022735 | A1 | 1/2012 | Tashiro et al. | |

FOREIGN PATENT DOCUMENTS

| | | | | |
|---|---|---|---|---|
| JP | 2000278815 A | * | 10/2000 | ............... B60L 15/20 |
| JP | 2000-320366 A | | 11/2000 | |
| JP | 2005-269833 A | | 9/2005 | |
| JP | 2010-200587 A | | 9/2010 | |
| JP | 2010-246307 A | | 10/2010 | |
| JP | 2011-229326 A | | 11/2011 | |
| JP | 2012-029461 A | | 2/2012 | |
| JP | 2012-090442 A | | 5/2012 | |
| JP | 2012-153175 A | | 8/2012 | |
| JP | 2012153175 A | * | 8/2012 | ............ B60W 30/18 |
| JP | 2014-075869 A | | 4/2014 | |
| JP | 2014-187779 A | | 4/2014 | |
| JP | 2014-155411 A | | 8/2014 | |
| JP | 2015-043669 A | | 3/2015 | |
| WO | WO 2013/157313 A1 | | 10/2013 | |
| WO | WO 2014/057910 A1 | | 4/2014 | |

* cited by examiner

CONTROL DEVICE FOR ELECTRIC VEHICLE AND CONTROL METHOD FOR ELECTRIC VEHICLE

TECHNICAL FIELD

The present invention relates to a control device for an electric vehicle and a control method for the electric vehicle.

BACKGROUND ART

Conventionally, in an electric vehicle that includes an electric machine as a traveling driving source, there has been known a technique where, when a driver releases an accelerator pedal, a braking force is generated by regeneration of the electric machine to decelerate or stop the vehicle (see JP2012-29461A).

In this technique, while the braking force by the regeneration of the electric machine is used for decelerating or stopping the vehicle, a mechanical braking force such as a parking brake is used for maintaining the stopping without the braking force by the electric machine, similarly to a common vehicle, after the vehicle is switched to a parking mode to turn an ignition switch signal OFF. Then, when the ignition switch signal is again transitioned to ON and a vehicle starting operation is performed, the electric machine generates a disturbance torque corresponding to a disturbance that acts on the vehicle, thus the stopping of the vehicle is maintained.

SUMMARY OF INVENTION

However, in the conventional technique, the disturbance torque rises after the vehicle starting operation is performed, and subsequently, braking is started. Then, until the disturbance torque corresponding to the disturbance acting on the vehicle is generated, it is a problem that a sliding down of the vehicle occurs especially on a slope road.

It is an object of the present invention to provide a technique for reducing a sliding down of a vehicle that occurs especially on a slope road immediately after a vehicle starting operation is performed.

A control device for the electric vehicle according to an embodiment has the motor that generates the driving torque and the regenerative torque corresponding to the accelerator operation by the driver. The control device for the electric vehicle for the electric vehicle determines whether or not the starting operation of the vehicle has been performed by the driver, calculates the disturbance torque estimated value Td necessary for maintaining the vehicle stop state corresponding to the disturbance acting on the vehicle, and performs a control such that the driving torque of the motor converges to the disturbance torque estimated value Td when the vehicle is determined to be just before stop of the vehicle during running or determined to have undergone the starting operation. Then, the control device for the electric vehicle controls the responsiveness of the driving torque to the disturbance acting on the vehicle, and increases the responsiveness of the driving torque of the motor compared with the responsiveness of the driving torque just before stop of the vehicle when the starting operation is determined to have been performed.

The following describes the embodiments of the present invention in detail with accompanying drawings.

DESCRIPTION OF EMBODIMENTS

First Embodiment

Figure 1:
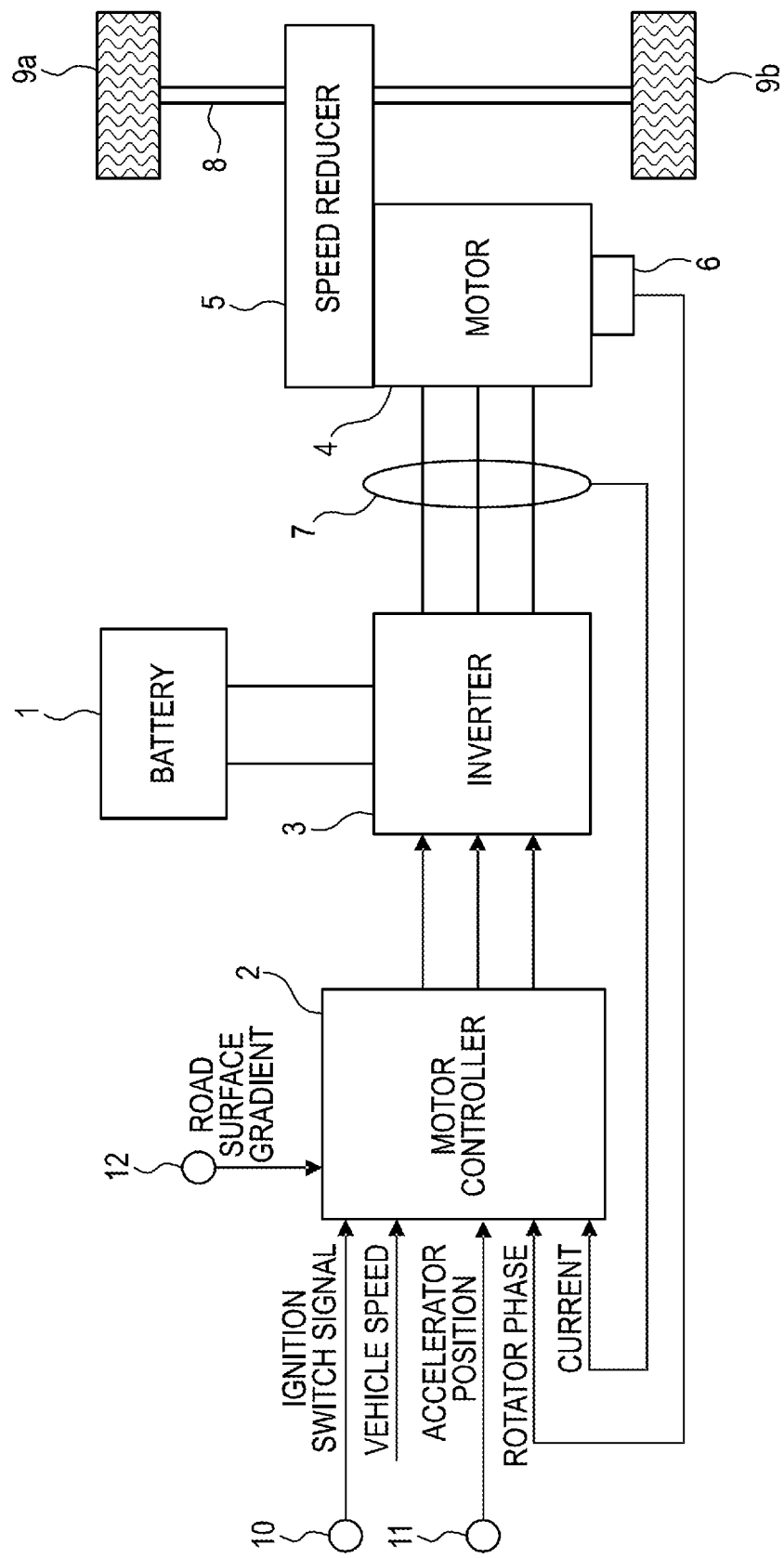
FIG. 1 is a block diagram illustrating a main configuration of an electric vehicle with a control device for an electric vehicle in a first embodiment.

FIG. 1 is a block diagram illustrating a main configuration of an electric vehicle with a control device for an electric vehicle in a first embodiment. The control device for the electric vehicle in the first embodiment is applicable to electric vehicles driven by electric motors. The electric vehicles include not only electric vehicles that have the electric motor alone as a driving source, but also hybrid vehicles that have the electric motor and an engine as the driving source. Especially, the control device for the electric vehicle according to the embodiment is applicable to a vehicle capable of controlling acceleration/deceleration and a stop only by an operation of an accelerator pedal. A driver driving the vehicle increases an accelerator position during acceleration, and decreases the accelerator position or makes the accelerator position to zero during deceleration or during stopping. However, on an uphill road, there is sometimes a case where the vehicle is coming to the stopped state while increasing the accelerator position for preventing retreat of the vehicle.

A motor controller 2 (hereinafter simply referred to as a controller 2) accepts inputs of signals indicating vehicle conditions, for example, an ignition switch signal, a vehicle speed V, an accelerator position AP, a rotator phase a of an electric motor (a three-phase AC motor) 4, and currents iu, iv, and iw of the electric motor 4. The controller 2 generates a PWM signal for controlling the electric motor 4 on the basis of the input signals. The controller 2 uses the generated PWM signal to perform an open/close control of a switching element of an inverter 3. The controller 2 has a function that causes a direct current supplied to the inverter 3 and the motor 4 from a battery 1 to be passed when the ignition signal is ON, and to be interrupted when the ignition signal is OFF.

The controller 2 has functions as starting determining means that determines whether or not starting conditions described later are satisfied, disturbance torque estimating means that estimates a disturbance torque described later, torque control means that controls a motor torque (driving torque) so as to be converged to a disturbance torque estimated value, and responsiveness control means that controls responsiveness of the driving torque to a disturbance acting on a vehicle. The controller 2 has a function as torque responsiveness variable means that can vary responsiveness (response speed of an actual torque to the disturbance) of the motor torque to the disturbance, more specifically, quick responsiveness that causes the disturbance torque estimated value to converge to a gradient disturbance, in controlling the motor torque corresponding to the vehicle state.

The inverter 3 turns on/off, for example, two switching elements (for example, power semiconductor elements such as IGBTs and MOS-FETs) included for each phase to convert a direct current supplied from the battery 1 into an alternating current and causes a desired current to flow into the electric motor 4.

The electric motor 4 generates a drive force by the alternating current supplied from the inverter 3 and transmits the drive force to right and left drive wheels 9a, 9b via a speed reducer 5 and a drive shaft 8. Further, when being rotated following the rotation of the drive wheels 9a, 9b during the travel of the vehicle, the electric motor 4 generates a regenerative drive force, thereby collecting the kinetic energy of the vehicle as electrical energy. In this case, the inverter 3 converts an alternating current generated during the regenerative operation of the electric motor 4 into a direct current and supplies the direct current to the battery 1.

A current sensor 7 detects the three-phase alternating currents iu, iv and iw flowing in the electric motor 4. Note that, since the sum of the three-phase alternating currents iu, iv and iw is 0, the currents of any two phases may be detected and the current of the remaining one phase may be obtained by calculation.

A rotation sensor 6 is, for example, a resolver or an encoder and detects the rotator phase a of the electric motor 4.

Figure 2:
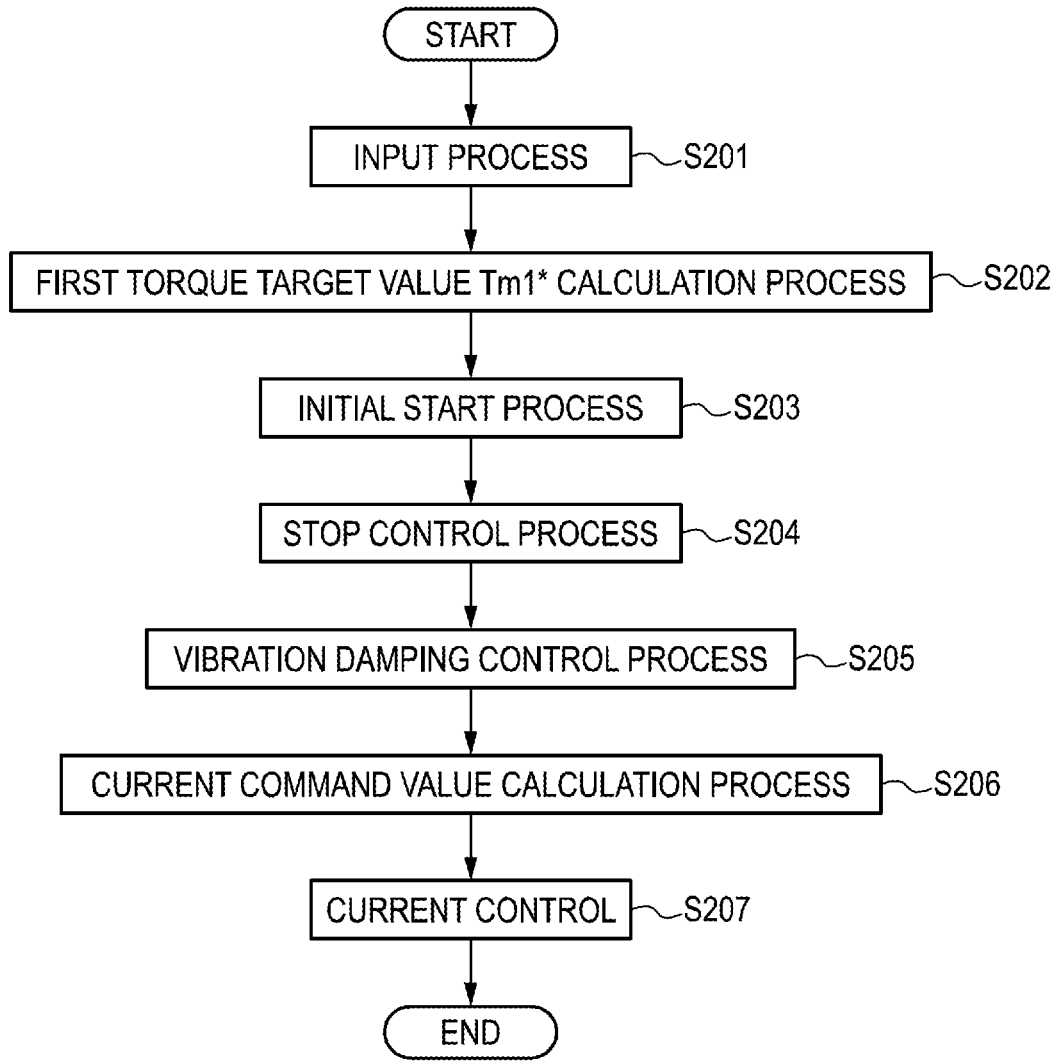
FIG. 2 is a flow of processes for a motor current control performed by a motor controller provided with the control device for the electric vehicle of the first embodiment.

FIG. 2 is a flowchart showing a flow of processes for a motor current control performed by the controller 2. The processes for the motor current control are always executed at constant intervals during a vehicle system is activated.

In Step S201, signals indicating the vehicle states are input to the controller 2. Here, the vehicle speed V (km/h), the accelerator position AP (%), the rotator phase a (rad) of the electric motor 4, a rotation speed Nm (rpm) of the electric motor 4, the three-phase alternating currents iu, iv and iw flowing in the electric motor 4, a direct-current voltage value Vdc (V) of the battery 1, and the ignition switch signal are input. A first torque target value Tm1* and a second torque target value Tm2*, which are calculated in the process of the current control one cycle before, are input as a past value Tm1_z of the first torque target value Tm1 and a past value Tm2_z of the second torque target value Tm2.

The vehicle speed V (km/h) is obtained by a vehicle speed sensor (not illustrated) or through communications from another controller. Alternatively, the controller 2 multiplies a rotator mechanical angular velocity ωm by a tire dynamic radius R and divides the product by a gear ratio of a final gear to obtain a vehicle speed v (m/s), and multiplies the product by 3600/1000 for unit conversion, thereby obtaining the vehicle speed V (km/h).

The controller 2 obtains the accelerator position AP (%) from an accelerator position sensor 11 (accelerator position detecting means). The accelerator position AP (%) may be obtained through communications from another controller such as a vehicle controller (not illustrated).

The rotator phase a (rad) of the electric motor 4 is obtained from the rotation sensor 6. The rotation speed Nm (rpm) of the electric motor 4 is obtained by dividing a rotator angular velocity ω (electric angle) by a pole pair number p of the electric motor 4 to obtain a motor rotation speed ωm (rad/s), which is a mechanical angular velocity of the electric motor 4, and multiplying the obtained motor rotation speed ωm by 60/(2π). The rotator angular velocity ω is obtained by differentiating the rotator phase a. The rotation sensor 6 has a function as speed parameter detecting means.

The currents iu, iv and iw (A) flowing in the electric motor 4 are obtained from the current sensor 7.

The direct-current voltage value Vdc (V) is obtained from a voltage sensor (not illustrated) provided in a direct-current power supply line between the battery 1 and the inverter 3. The direct-current voltage value Vdc (V) may be detected by a signal transmitted from a battery controller (not illustrated).

The controller 2 directly obtains the ignition switch signal from an ignition switch 10. The ignition switch signal may be obtained through communications from another controller such as a vehicle controller (not illustrated).

In Step S202, the controller 2 sets the first torque target value Tm1*. Specifically, the first torque target value Tm1* is set on the basis of the accelerator position AP and the motor rotation speed ωm input in Step S201 by referring to an accelerator position-torque table illustrated in FIG. 3. As described above, the control device for the electric vehicle according to the embodiment is applicable to the vehicle capable of controlling acceleration/deceleration and the stop only by the operation of the accelerator pedal, and ensures the deceleration or the stop when the accelerator position is small. Therefore, in the accelerator position-torque table illustrated in FIG. 3, the motor torque is set such that an amount of motor regeneration with the accelerator position of 0 (fully closed) is large, and the amount of motor regeneration increases as the accelerator position decreases. Accordingly, in the accelerator position-torque table, when the motor rotation speed ωm is positive and the accelerator position is 0 (fully closed), the negative motor torque is set so as to work the regenerative braking force. Note that, the accelerator position-torque table is not limited to the table illustrated in FIG. 3.

In Step S203, the controller 2 performs an initial start process. Specifically, whether or not it is on an initial start of the vehicle is determined, and when it is on the initial start, various control parameters on the motor torque control are changed to control parameters on the initial start. The control parameters here mean various setting values where the vehicle is smoothly stopped by only the motor torque regardless of a gradient and a vehicle stop state in a control system of the motor torque is held.

Here, on the initial start means when the controller 2 determines the starting operation to be performed. In this embodiment, when the ignition switch signal obtained in Step S201 is transitioned from an OFF state to an ON state, the starting operation is determined to be performed.

In the start determination, the starting operation may be determined to be performed when a parking brake is released or when a shift position is transitioned from a parking shift, in addition to the case where the ignition switch signal obtained in Step S201 is transitioned from the OFF state to the ON state. In the start determination, the starting operation may be determined to be performed when at least any one of a case where the parking brake is released and a case where the shift position is transitioned from the parking shift is detected without detecting whether or not the ignition switch signal is transitioned from the OFF state to the ON state.

The control parameters on the initial start to be set are set such that the responsiveness of the motor torque to the disturbance is high compared with control parameters on a stop control process executed just before stop of the vehicle, so as to reduce a distance of the sliding down, what is called a rollback, which possibly occurs on the initial start on the slope road, of the vehicle to a minimum. The set control parameters on the initial start are returned to control parameters during normal running after predetermined conditions are satisfied.

In Step S204, the controller 2 performs the stop control process. Specifically, the controller 2 determines whether or not it is just before stop of the vehicle. When it is not just before stop of the vehicle, the controller 2 sets the first torque target value Tm1* calculated in Step S202 to a third motor torque command value Tm3*, and when it is just before stop of the vehicle, the controller 2 sets the second torque target value Tm2* to the third motor torque command value Tm3*. The second torque target value Tm2* converges to a disturbance torque command value Td with the decrease of the motor rotation speed, and the second torque target value Tm2* is a positive torque on an uphill road, a negative torque on a downhill road, and almost zero on a flat road. In this way, the vehicle stop state can be maintained regardless of a gradient of a road surface. The detail of the stop control process is described later.

In Step S205, the controller 2 performs a vibration damping control process. Specifically, the controller 2 performs the vibration damping control process on the motor torque command value Tm3* calculated in Step S204 and the motor rotation speed ωm. In this way, the calculated motor torque command value Tm* reduces a torque transmission system vibration (such as a torsional vibration of the drive shaft) without sacrificing the response of a drive shaft torque. The detail of the vibration damping control process is described later.

Subsequently, in Step S206, the controller 2 performs a current command value calculation process. Specifically, a d-axis current target value id* and a q-axis current target value iq* are obtained on the basis of the motor rotation speed ωm and the direct-current voltage value Vdc in addition to the motor torque target value Tm* calculated in Step S205. For example, a table defining a relationship of the d-axis current target value and the q-axis current target value with the torque command value, the motor rotation speed, and the direct-current voltage value is prepared in advance and the d-axis current target value id* and the q-axis current target value iq* are obtained by referring to this table.

In Step S207, a current control is performed to match a d-axis current id and a q-axis current iq with the d-axis current target value id* and the q-axis current target value iq* obtained in Step S206, respectively. To this end, the d-axis current id and the q-axis current iq are first obtained on the basis of the three-phase alternating current values iu, iv and iw and the rotator phase a of the electric motor 4 input in Step S201. Subsequently, d-axis and q-axis voltage command values vd and vq are calculated from deviations between the d-axis and q-axis current command values id* and iq* and the d-axis and q-axis currents id and iq.

Subsequently, from the d-axis and q-axis voltage command values vd and vq and the rotator phase a of the electric motor 4, three-phase alternating-current voltage command values vu, vv, and vw are obtained. Then, from the obtained three-phase alternating-current voltage command values vu, vv, and vw and the current voltage value Vdc, PWM signals tu (%), tv (%), and tw (%) are obtained. By opening and closing the switching elements of the inverter 3 by the PWM signals tu, tv and tw obtained in this way, the electric motor 4 can be driven with a desired torque instructed by the torque command value Tm*.

Here, before the initial start process as a point of the present invention is described in detail, a transmission characteristic Gp(s) from the torque target value Tm to the motor rotation speed ωm is described, and subsequently, the above-described stop control process and vibration damping control is described in detail in the control device for the electric vehicle according to the embodiment.

<Transmission Characteristics Gp(s)>

Figure 4:
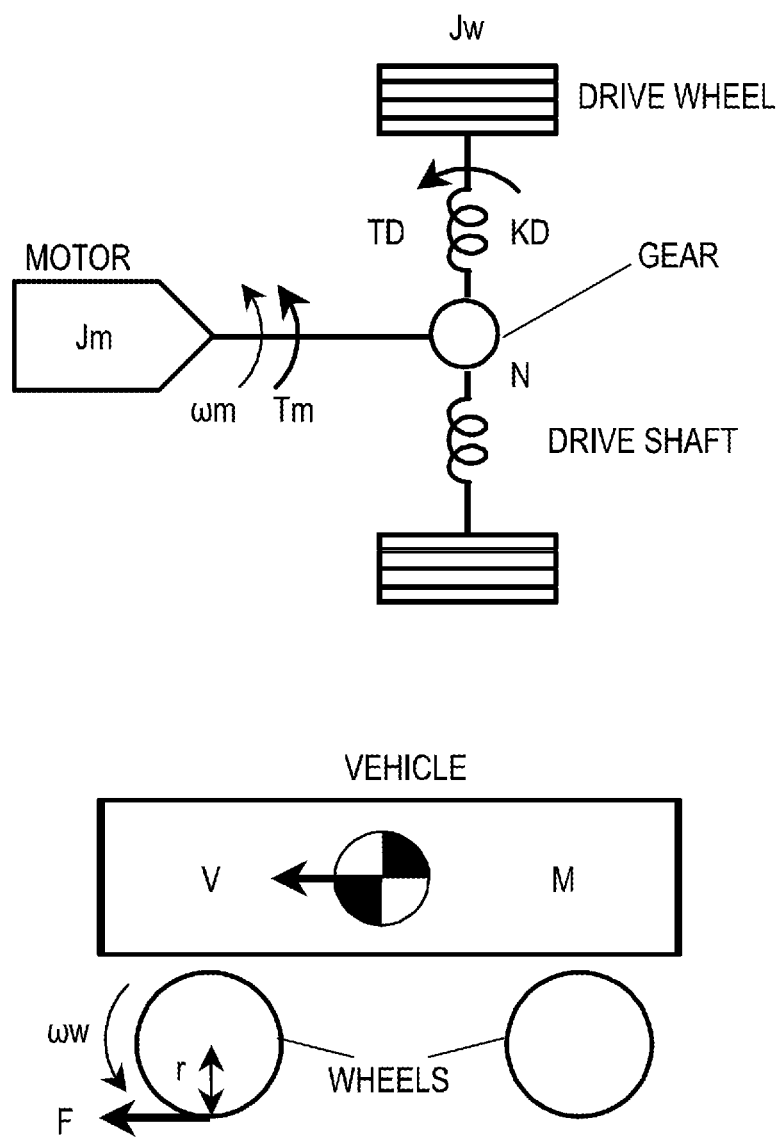
FIG. 4 is a diagram modeling a drive force transmission system of a vehicle.

FIG. 4 is a diagram modeling a drive force transmission system of the vehicle, and each parameter in the diagram is as described below.

Jm: inertia of electric motor
Jw: inertia of drive wheels
M: weight of vehicle
KD: torsional rigidity of drive system
N: overall gear ratio
r: excessive radius of tires
ωm: rotation speed of electric motor
Tm: torque target value
TD: torque of drive wheels
F: force applied to vehicle
V: speed of vehicle
ωw: rotation speed of drive wheels The following equations of motion can be derived from FIG. 4. Note that, the asterisk (*) attached to the right-upper corner of a symbol in the following Equations (1) to (3) indicates a time differential.

[Equation 1]
$$Jm \cdot \omega m^* = Tm - TD/N \quad (1)$$

[Equation 2]
$$2Jw \cdot \omega w^* = TD - rF \quad (2)$$

[Equation 3]
$$M \cdot V^* = F \quad (3)$$

[Equation 4]
$$TD = KD \cdot \int (\omega m/N - \omega w) dt \quad (4)$$

[Equation 5]
$$F = Kt(r \cdot \omega w - V) \quad (5)$$

Note that, Kt in Equation (5) indicates a coefficient of friction between a tire and a road surface.

The transmission characteristic Gp(s) from the torque target value Tm of the electric motor 4 to the motor rotation speed ωm obtained on the basis of the equations of motion (1) to (5) are expressed by the following Equation (6).

[Equation 6]

$$G_p(s) = \frac{b_3 s^3 + b_2 s^2 + b_1 s + b_0}{s(a_4 s^3 + a_3 s^2 + a_2 s + a_1)} \quad (6)$$

Here, each parameter in Equation (6) is expressed by the following Equation (7).

[Equation 7]

$a_4 = 2Jm \cdot Jw \cdot M$ $a_3 = Jm(2Jw + Mr^2)Kt$ $a_2 = (Jm + 2Jw/N^2)M \cdot KD$ $a_1 + (Jm + 2Jw/N^2 + Mr^2/N^2)KD \cdot Kt$ $b_3 = 2Jw \cdot M$ $b_2 = (2Jw + Mr^2)Kt$ $b_1 = M \cdot KD$ $b_0 = KD \cdot Kt$ (7)

Through examinations, the poles and 0 points of a transfer function shown in Equation (6) can be approximated to a transfer function of the following Equation (8), and one pole and one 0 point indicate values extremely close to each other. This is equivalent to that α and β of the following Equation (8) indicate values extremely close to each other.

[Equation 8]

$$G_p(s) = \frac{(s + \beta)(b'_2 s^2 + b'_1 s + b'_0)}{s(s + \alpha)(a'_3 s^2 + a'_2 s + a'_1)} \quad (8)$$

Accordingly, by performing pole-zero cancellation (approximation to α=β) in Equation (8), Gp(s) constitutes transmission characteristic of (second order)/(third order) as shown in the following Equation (9).

[Equation 9]

$$G_p(s) = \frac{(b'_2 s^2 + b'_1 s - b'_0)}{s(a'_3 s^2 + a'_2 s + a'_1)} \cdot \frac{\beta}{\alpha} \quad (9)$$

As described above, the transmission characteristic Gp(s) from the torque target value Tm to the motor rotation speed ωm in the torque transmission system of the vehicle are obtained.

<Stop Control Process>

Figure 5:
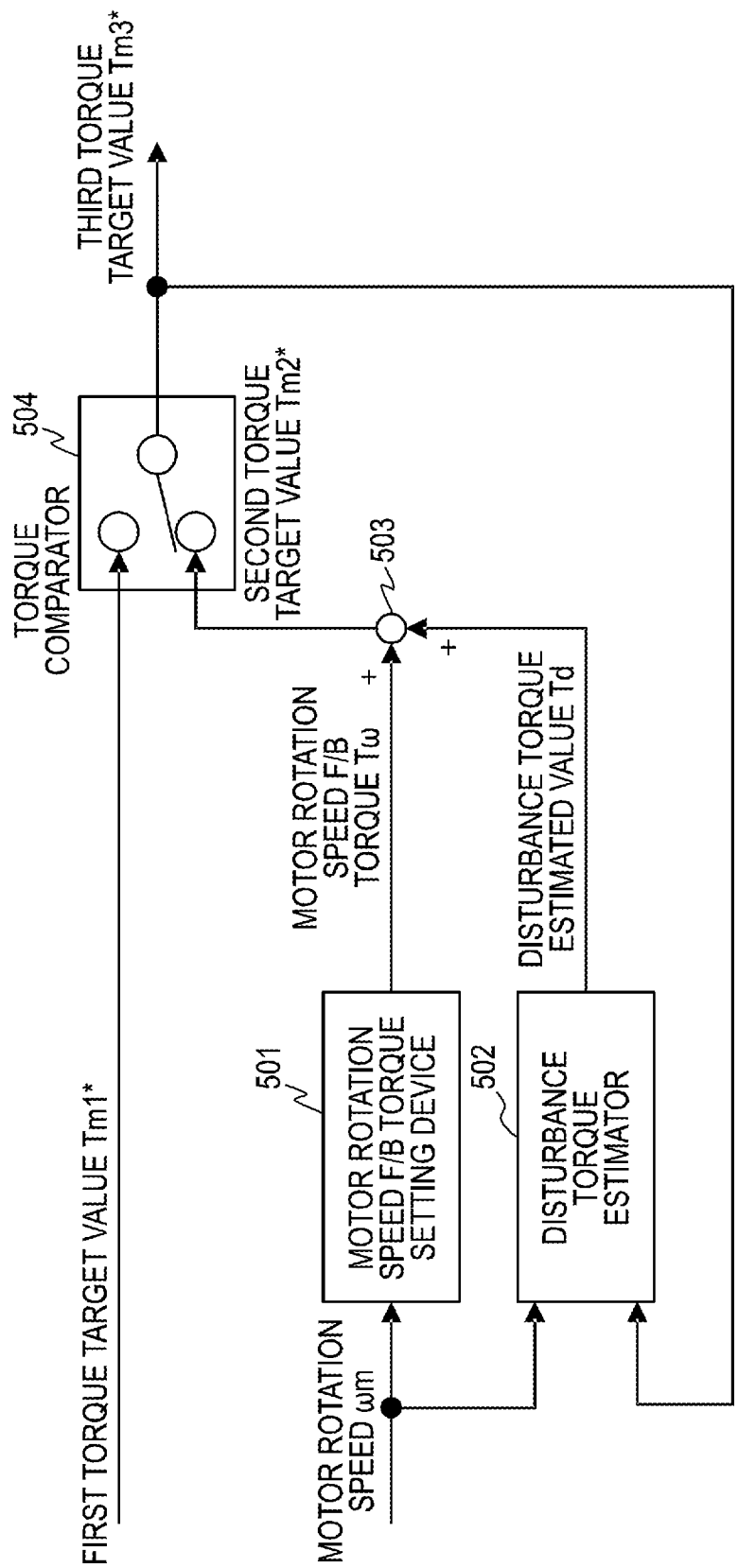
FIG. 5 is a block diagram for achieving a stop control process.

Next, the detail of the stop control process performed in Step S204 in FIG. 2 is described with reference to FIG. 5 to FIG. 7. FIG. 5 is a block diagram for achieving the stop control process.

A motor rotation speed F/B torque setting device 501 calculates a motor rotation speed feedback torque Tω (hereinafter referred to as a motor rotation speed F/B torque Tω) to stop the electric vehicle by the regenerative braking force from the electric motor 4 on the basis of the detected motor rotation speed ωm.

Figure 6:
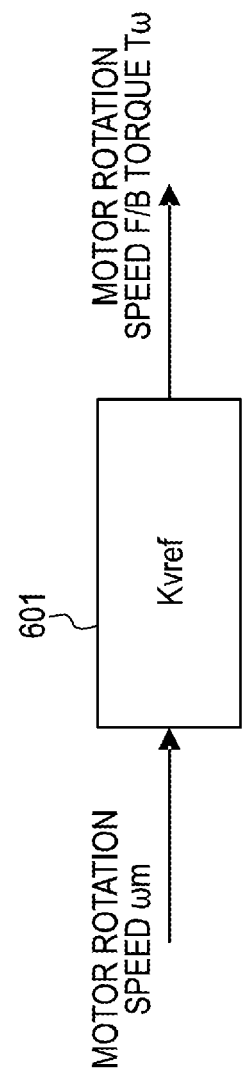
FIG. 6 is a diagram describing a method for calculating a motor rotation speed F/B torque $T\omega$ on the basis of a motor rotation speed $\omega m$.

FIG. 6 is a diagram describing a method for calculating the motor rotation speed F/B torque Tω on the basis of the motor rotation speed ωm. The motor rotation speed F/B torque setting device 501 includes a multiplier 601 and calculates the motor rotation speed F/B torque Tω by multiplying the motor rotation speed ωm by a gain Kvref.

However, the gain Kvref is a negative (minus) value necessary to stop the electric vehicle just before the electric vehicle stops, and appropriately set, for example, from experimental data or similar data.

It should be noted that, although the motor rotation speed F/B torque setting device 501 is described to calculate the motor rotation speed F/B torque Tω by multiplying the motor rotation speed ωm by the gain Kvref, the motor rotation speed F/B torque Tω may be calculated using a regenerative torque table defining a regenerative torque with respect to the motor rotation speed ωm, an attenuation rate table storing an attenuation rate of the motor rotation speed ωm in advance.

A disturbance torque estimator 502 illustrated in FIG. 5 calculates a disturbance torque estimated value Td on the basis of the detected motor rotation speed ωm and the third torque target value Tm3*.

Figure 7:
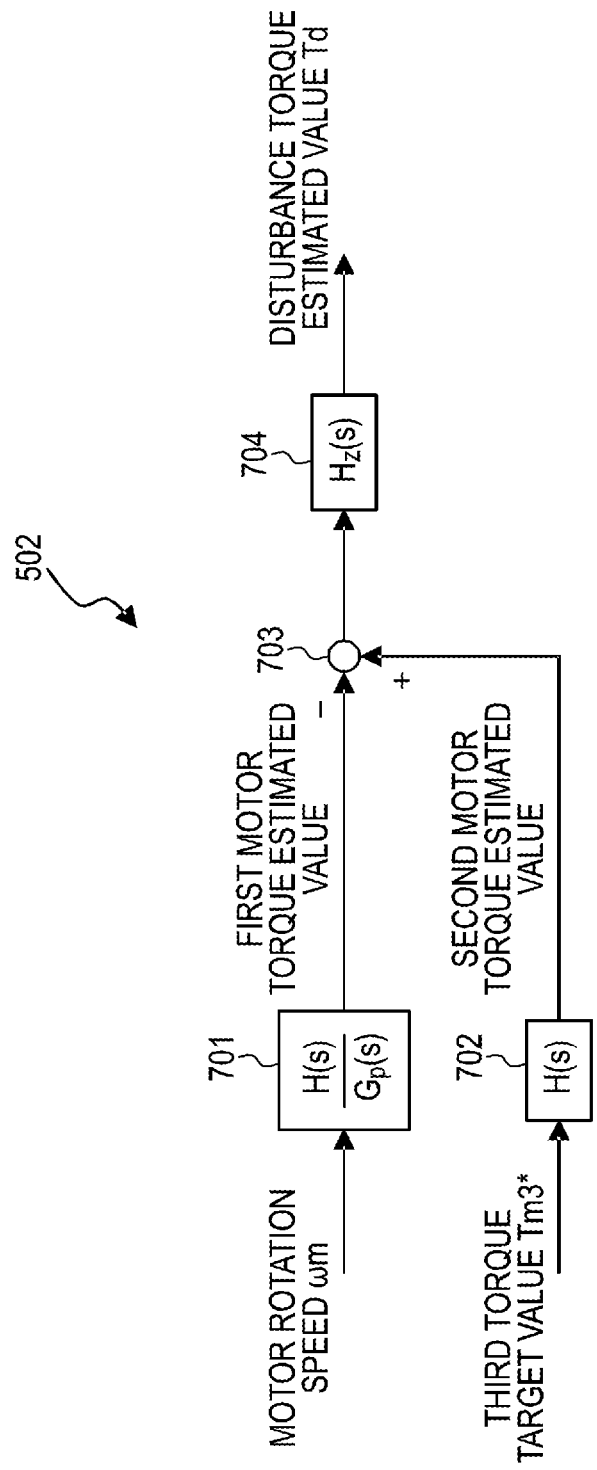
FIG. 7 is a diagram describing a method for calculating a disturbance torque estimated value Td.

FIG. 7 is a diagram describing a method for calculating the disturbance torque estimated value Td on the basis of the motor rotation speed ωm and the third torque target value Tm3*.

A control block 701 functions as a filter having a transmission characteristic H(s)/Gp(s) and performs a filtering process on the motor rotation speed ωm, thus calculating a first motor torque estimated value. Gp(s) is a model for the transmission characteristic of the torque input to the vehicle and the rotation speed of the motor, and is expressed by the above Equation (9). H(s) is a low-pass filter having such transmission characteristic that a difference between the denominator degree and the numerator degree is equal to or more than a difference between the denominator degree and the numerator degree of a model Gp(s).

A control block 702 functions as a low-pass filter having a transmission characteristic H(s) set to a predetermined time constant, and performs the filtering process on the third torque target value Tm3*, thus calculating a second motor torque estimated value.

A subtractor 703 subtracts the first motor torque estimated value calculated by the control block 701 from the second motor torque estimated value calculated in the control block 702.

A control block 704 is a filter having a transmission characteristic Hz(s), and performs the filtering process on the output of the subtractor 703, thus calculating the disturbance torque estimated value Td.

Here, a description will be given of the transmission characteristic Hz(s). The above Equation (9) is rewritten to obtain the following Equation (10). Note that, ζz, ωz, ζp, and ωp in Equation (10) are each expressed by Equation (11).

[Equation 10]

$$G_p(s) = Mp \frac{(s^2 + 2\xi_z \cdot \omega_z \cdot s + \omega_z^2)}{s(s^2 + 2\xi_p \cdot \omega_p \cdot s + \omega_p^2)} \quad (10)$$

[Equation 11]

$$\xi_z = \frac{b'_1}{2(b'_0 \cdot b'_2)^{1/2}} \quad (11)$$

$$\omega_z = \left(\frac{b'_0}{b'_2}\right)^{1/2}$$

$$\xi_p = \frac{a'_2}{2(a'_1 \cdot a'_3)^{1/2}}$$

$$\omega_p = \left(\frac{a'_1}{a'_3}\right)^{1/2}$$

As described above, Hz(s) is expressed by the following Equation (12).

[Equation 12]

$$H_z(s) = \frac{(s^2 + 2\xi_z \cdot \omega_z \cdot s + \omega_z^2)}{(s^2 + 2\xi_c \cdot \omega_z \cdot s + \omega_z^2)} \quad (12)$$

The disturbance torque estimated value Td calculated as described above is estimated by a disturbance observer as illustrated in FIG. 7, and is a parameter indicating a disturbance that acts on the vehicle.

Here, while the air resistance, a modeling error caused by a variation of a vehicle weight due to the number of passengers and load capacity, a rolling resistance of the tires, a gradient resistance of the road surface, and a similar resistance are thought as the disturbances acting on the vehicle, a disturbance factor dominant just before the stop of the vehicle and on the initial start is the gradient resistance. While the disturbance factors differ depending on driving conditions, the disturbance factors described above can be collectively estimated since the disturbance torque estimator 502 calculates the disturbance torque estimated value Td on the basis of the motor torque command value Tm*, the motor rotation speed ωm, and the vehicle model Gp(s). This achieves a smooth vehicle stop from deceleration under any driving condition.

Referring back to FIG. 5, the explanation will be continued. An adder 503 calculates the second torque target value Tm2* by adding the motor rotation speed F/B torque Tω calculated by the motor rotation speed F/B torque setting device 501 and the disturbance torque estimated value Td calculated by the disturbance torque estimator 502.

A torque comparator 504 compares the magnitudes of the first torque target value Tm1* with the second torque target value Tm2* and sets the larger torque target value as the third torque target value Tm3*. While the second torque target value Tm2* is smaller than the first torque target value Tm1* during the travel of the vehicle, when the vehicle decelerates and the disturbance increases just before stop of the vehicle (the vehicle speed is equal to or less than a predetermined vehicle speed), the second torque target value Tm2* becomes larger than the first torque target value Tm1*. Thus, when the first torque target value Tm1* is larger than the second torque target value Tm2*, the torque comparator 504 determines that it is not just before stop of the vehicle and sets the third torque target value Tm3* to the first torque target value Tm1*. Further, when the second torque target value Tm2* is larger than the first torque target value Tm1*, the torque comparator 504 determines that the vehicle is just before the stop of the vehicle and sets the third torque target value Tm* to the second torque target value Tm2*. It should be noted that the second torque target value Tm2* is a positive torque on an uphill road, a negative torque on a downhill road, and converges to almost zero on a flat road to maintain the vehicle stop state.

<Vibration Damping Control Process>

Next, a description will be given of the vibration damping control process of Step S205 in FIG. 2. In this Step, the vibration damping control process is performed on the third torque target value Tm3* calculated in Step S204 to obtain the motor torque command value Tm*. The following specifically describes with reference to FIG. 8 and FIG. 9.

Figure 8:
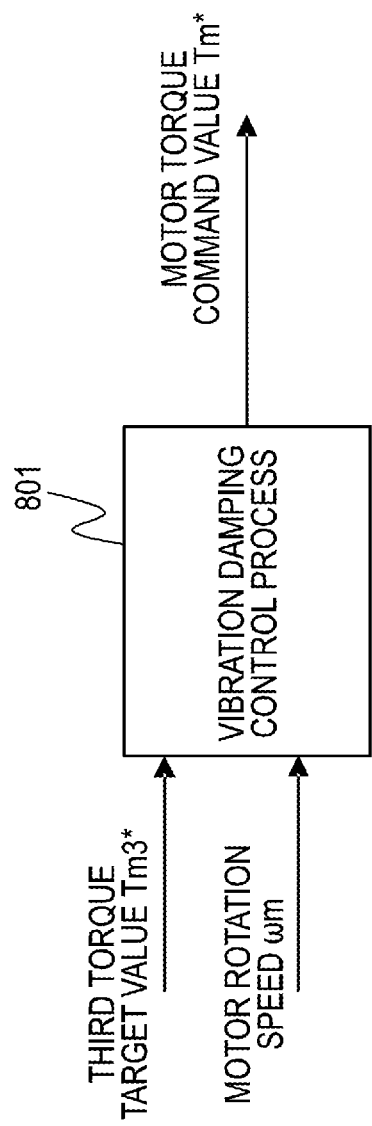
FIG. 8 is a block diagram describing a stop control process by the control device for the electric vehicle in the embodiments of the present invention.

FIG. 8 is a block diagram of the vibration damping control process used in this embodiment. Here, the motor torque command value Tm3* calculated in Step S204 and the motor rotation speed ωm are input to a vibration damping control block 801 to calculate the motor torque command value Tm* that reduces a torque transmission system vibration (such as a torsional vibration of the drive shaft) without sacrificing the response of a drive shaft torque. The following describes an example of the vibration damping control process performed by the vibration damping control block 801 with reference to FIG. 9.

Figure 9:
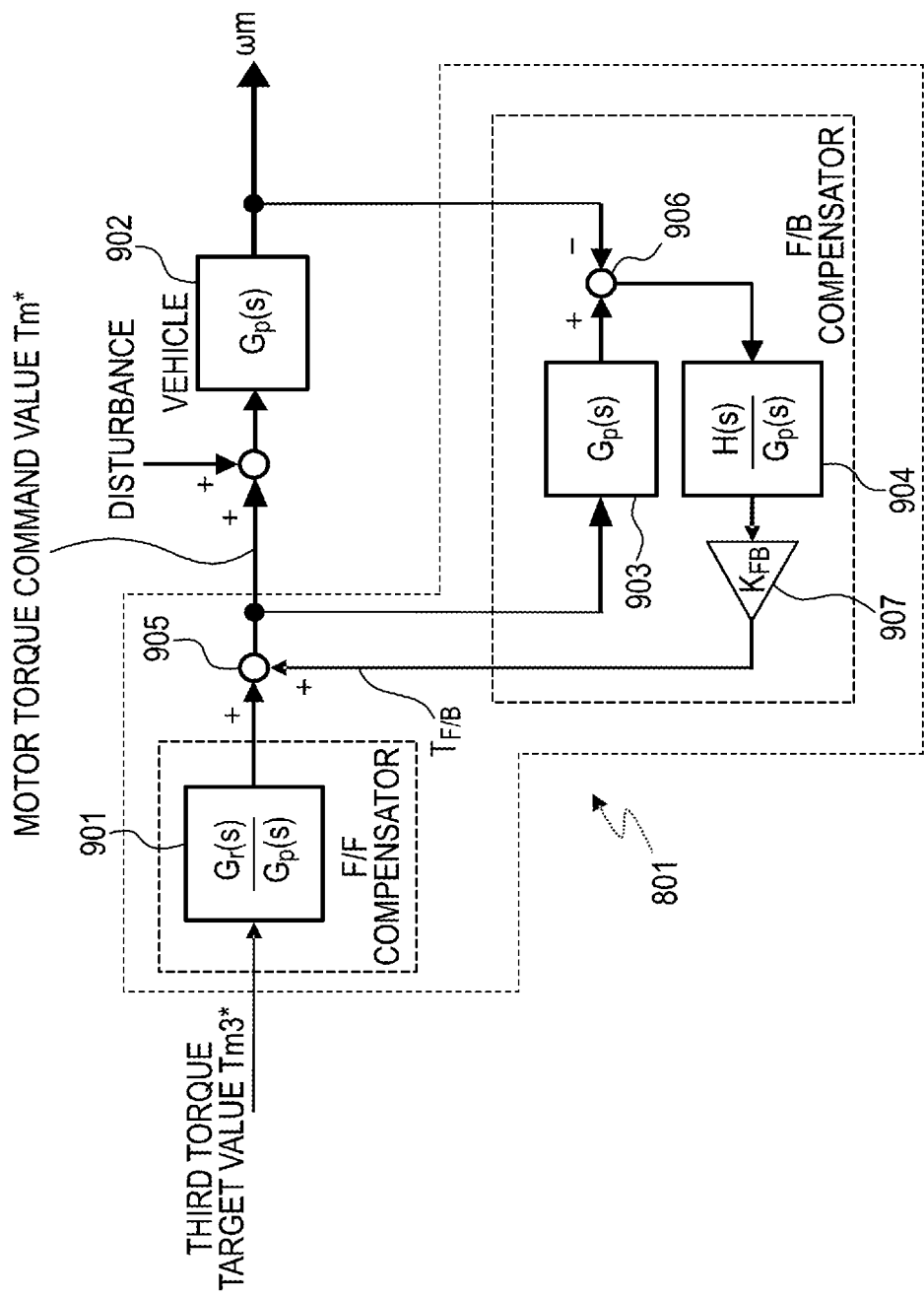
FIG. 9 is a block diagram describing the stop control process by the control device for the electric vehicle in the first embodiment.

FIG. 9 is a block diagram describing a detail of the vibration damping control process used in this embodiment. A feedforward compensator 901 (hereinafter referred to as an F/F compensator) functions as a filter having a transfer characteristic Gr(s)/Gp(s), which is constituted of a transfer characteristic Gr(s) and an inverse system of the model Gp(s) for the transfer characteristic of the torque input to the vehicle and the rotation speed of the motor. By performing the filtering process on the third torque target value Tm3*, the vibration damping control process by the feedforward compensation is performed. The used transfer characteristic Gr(s) can be expressed by the following Equation (13).

[Equation 13]

$$Gr(s) = Mp \frac{(s^2 + 2\xi_z \cdot \omega_z \cdot s + \omega_z^2)}{s(s^2 + 2\omega_p \cdot s + \omega_p^2)} \quad (13)$$

It should be noted that, the vibration damping control F/F compensation performed by the F/F compensator 901 may be the vibration damping control described in JP2001-45613A or may be the vibration damping control described in JP2002-152916A.

Control blocks 903 and 904 are filters used for the feedback control (hereinafter the feedback is referred to as the F/B). The control block 903 is the filter having the above-described transfer characteristic Gp(s). The control block 903 performs the filtering process on values obtained by adding the output from the F/F compensator 901, which is output from an adder 905, to the output from the control block 904 described later. A subtractor 906 subtracts the motor rotation speed ωm from the value output from the control block 903. The subtracted value is input to the control block 904. The control block 904 is a filter having a transfer characteristic H(s)/Gp(s), which is constituted of the low-pass filter H(s) and an inverse system of the model Gp(s) for the transfer characteristic of the torque input to the vehicle and the rotation speed of the motor. The control block 904 performs the filtering process on the output from the subtractor 906. The value calculated as an F/B compensation torque after the filtering process is output to a gain compensator 907.

The gain compensator 907 is a filter having a gain $K_{FB}$, and is configured to adjust a value of the gain $K_{FB}$ to adjust stability of an F/B compensator used in the vibration damping control process. An F/B compensation torque $T_{F/B}$, on which the gain adjustment is performed by the gain compensator 907, is output to the adder 905.

Then, the adder 905 adds the third torque target value Tm3*, on which the vibration damping control process has been performed by the F/F compensator 901, to the above-described value $T_{F/B}$ calculated as the F/B compensation torque, so as to calculate the motor torque command value Tm* to reduce the vibrations in the torque transmission system for the vehicle.

It should be noted that, the vibration damping control performed by the vibration damping control block 801 may be the vibration damping control described in JP2003-9566A or may be the vibration damping control described in JP2010-288332A.

The details of the motor torque control during normal running including just before stop of the vehicle have been described above. The following describes the initial start process in detail with this premise.

Here, a description will be given of a purpose of the initial start process. As described above, the initial start process described below is a process for setting a control parameter where the responsiveness of the motor torque to the disturbance, especially the gradient disturbance, is increased to reduce the rollback of the vehicle on the initial start.

The disturbance torque estimated value on the initial start does not match the actual gradient disturbance because of the initialization to a predetermined value (for example, equivalent to a flat road) during stopping of the vehicle system. Therefore, on the initial start on the slope road, the disturbance torque estimated value Td rises immediately after the initial start of the vehicle, and the rollback of the vehicle occurs depending on the gradient before the convergence to the actual gradient disturbance. It is an object of the initial start process described below to increase the quick responsiveness of the disturbance torque estimated value Td to the gradient disturbance to increase the responsiveness of the motor torque to the gradient disturbance, thus reducing the distance of the rollback that possibly occurs immediately after the initial start of the vehicle.

<Initial Start Process>

Figure 10:
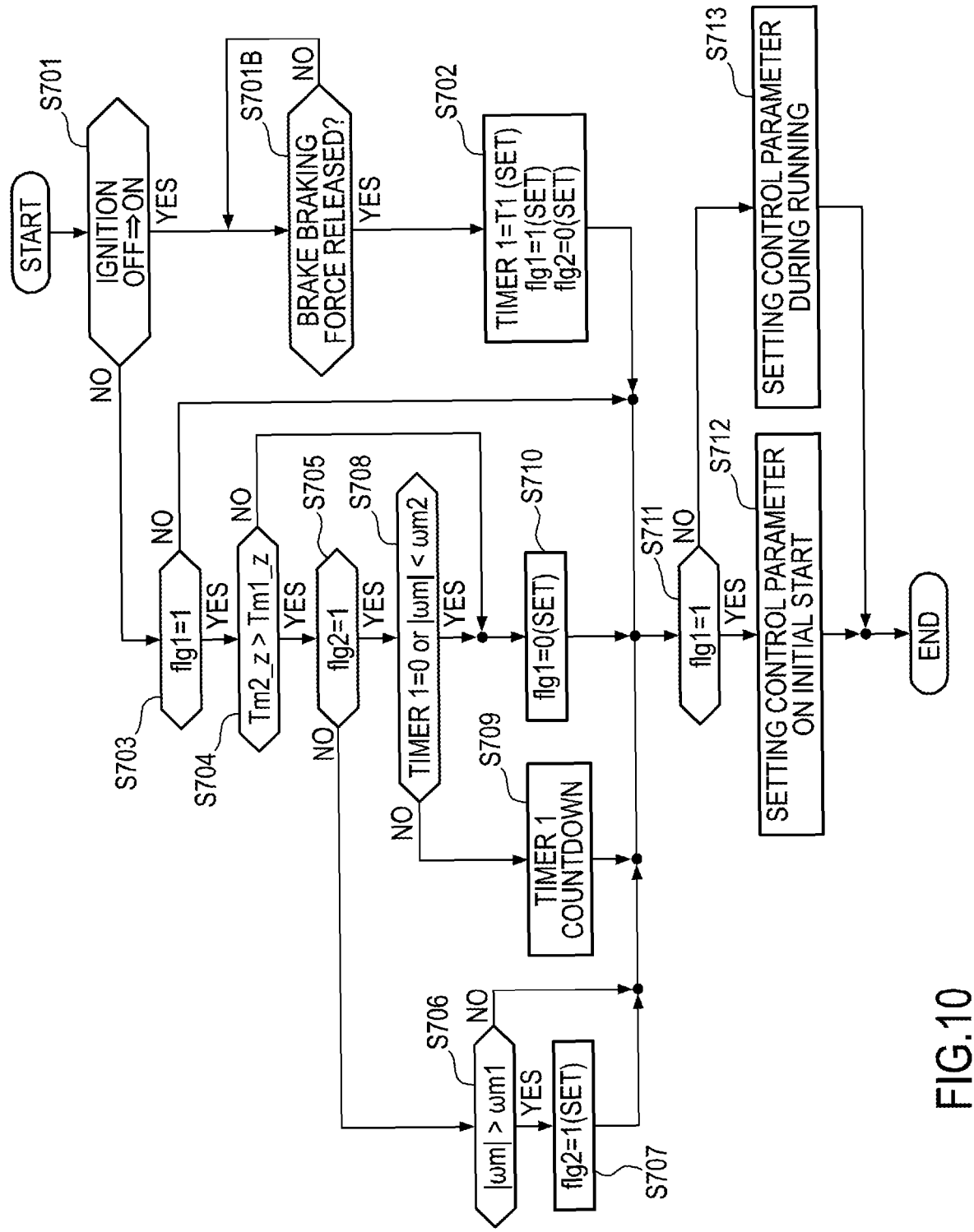
FIG. 10 is a flow of an initial start process performed by the motor controller provided with the control device for the electric vehicle in the first embodiment.

FIG. 10 is a flowchart of the initial start process executed in Step S203 in FIG. 2. The initial start process is always executed by the controller 2 at a constant cycle during electric power is supplied to the controller 2.

In Step S701, the controller 2 determines whether or not the ignition switch signal has transitioned from OFF to ON. When a driver operates an ignition switch (a start switch) of the vehicle to transition the ignition switch signal from OFF to ON, the controller 2 executes a subsequent process of Step S701B. When the ignition switch signal stays at the ON state, that is, when the vehicle state is not immediately after the initial start, the controller 2 executes a process of Step S703.

In Step S701, when the ignition switch signal has transitioned from OFF to ON, the controller 2 may execute the process of following Step S701B when it is further determined to be in at least any one of the cases, a case where the parking brake is determined to have been released and a case where the shift position has been transitioned from the parking shift, and the controller 2 may execute the process of Step S703 in the other cases.

The controller 2 may execute the process of following Step S701B when it is determined to be in at least any one of the cases, a case where the parking brake is determined to have been released and a case where the shift position is determined to have been transitioned from the parking shift without determining whether or not the ignition switch signal has transitioned from OFF to ON, and the controller 2 may execute the process of Step S703 in the other cases.

In Step S701B, the controller 2 determines whether or not a mechanical braking force by a foot brake has been released. When the mechanical braking force by the foot brake has been released, a process of Step S702 is executed. While the mechanical braking force is acting on the vehicle, the process of Step S701B is looped to be executed. The controller 2 may omit the process of this Step. That is, in the process of Step S701, the controller 2 may subsequently execute the process of Step S702 when it is determined to be YES.

In Step S702, a timer 1, a flag 1 (hereinafter referred to as a flg1), and a flag 2 (hereinafter referred to as a flg2) are set to the timer 1=T1, the flg1=1, and the flg2=0, respectively.

Here, a description will be given of the flg1, the flg2, and the timer 1.

The flg1 is a flag for determining switching between the control parameter during normal running including just before stop of the vehicle and the control parameter on the initial start. The flg1=1 means to be immediately after the transition of the ignition switch signal from OFF to ON, that is, the vehicle state immediately after the initial start. When the process of Step S701B is not omitted, the flg1=1 means a state where it is immediately after the transition of the ignition switch signal from OFF to ON and the mechanical braking force by the brake has been released.

The flg2 is a flag for determining whether or not the vehicle is in a state of the rollback. The flg2=0 as an initial value means that the vehicle is not in the rollback.

The timer 1 is a timer for measuring a liming to return the set control parameter on the initial start to the control parameter during normal running. A count value T1 set immediately after the initial start is a time period until the gradient disturbance of the road surface on which the vehicle stops matches the disturbance torque estimated value calculated by the controller 2 and the motor torque is controlled with the motor torque command value Tm* to hold the vehicle stop state after the determination of the initial start. The count value T1 is a value preliminarily adapted through an experiment or the like.

The count value T1 is, for example, equivalent to five seconds. However, the count value T1 may be changed corresponding to a weight of the vehicle and the road surface gradient. For example, as the weight of the vehicle or the road surface gradient becomes large, the count value T1 is set to be a large value.

Referring back to the flowchart, the explanation will be continued. After the process of Step S702 is executed, a process of Step S711 is executed. In Step S711, a state of the flg1 is determined. In the case of the flg1=1, a process of Step S712 is executed. In the case of the flg1=0, a process of Step S713 is executed. When the ignition switch signal has transitioned from OFF to the ON state, the flg1=1 is set in Step S702, thus the controller 2 executes the process of Step S712.

In Step S712, the control parameter on the initial start is set as the control parameter used in the calculation of the disturbance torque estimated value Td. After the control parameter on the initial start is set, the initial start process terminates.

On the other hand, in Step S713 executed in the case of the flg1=0, the control parameter during normal running is set as the control parameter used in the calculation of the disturbance torque estimated value Td. After the control parameter during normal running is set, the initial start process terminates.

Next, a description will be given of the flow in the case of not the timing where the ignition switch signal transitions from OFF to the ON state.

In Step S703, the controller 2 determines the state of the flg1. In the case of the flg1=1, a process of Step S704 is executed. In the case of not the flg1=1, a process of Step S711 is executed.

Figure 3:
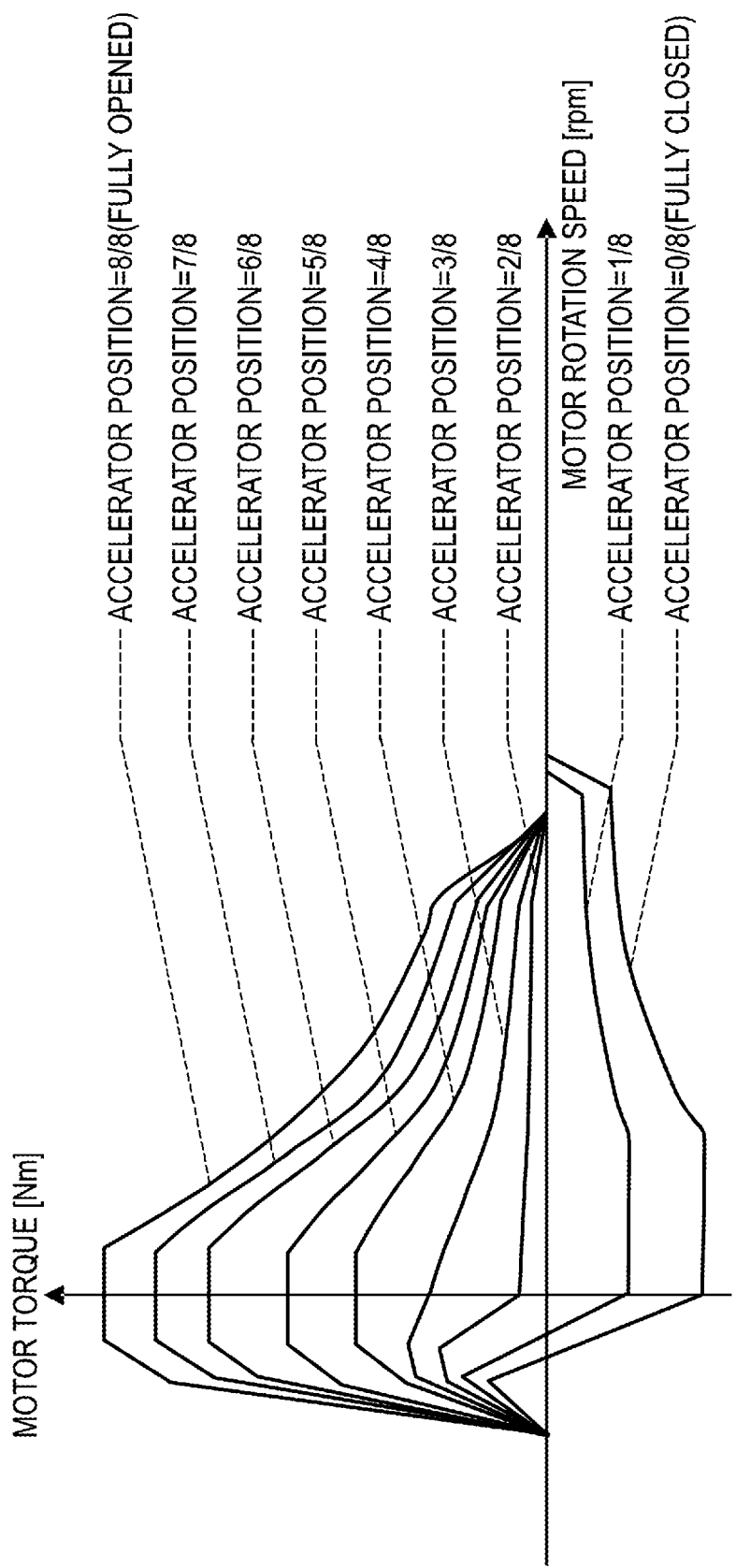
FIG. 3 is a diagram illustrating an exemplary accelerator position (accelerator opening degree)-torque table.

In Step S704, a past value Tm1_z of the first torque target value Tm1*, which is obtained by referring to the accelerator position-torque table illustrated in FIG. 3, is compared with a past value Tm2_z of the second torque target value Tm2*, which converges to the disturbance torque estimated value Td with the decrease of the motor rotation speed, on the basis of the accelerator position AP input in Step S201 in FIG. 2 and the motor rotation speed ωm. When Tm2_z>Tm1_z is satisfied, a process of Step S705 is executed for determining whether or not the vehicle is during the rollback. When Tm2_z>Tm1_z is not satisfied, it is determined that the vehicle is in the state of normal running, for example, a state where the driver presses the accelerator pedal to accelerate the vehicle, and a process of Step S710 is executed.

In Step S704, it may be determined whether or not the accelerator position is zero, instead of comparing the past value Tm1_z of the first torque target value Tm1* with the past value Tm2_z of the second torque target value Tm2*. When the accelerator position=0 is satisfied, the process of Step S705 is executed. When the accelerator position=0 is not satisfied, it is determined that the vehicle has started the running corresponding to an intention of the driver, the flg is set to 0 in Step S710, and subsequently, the process of Step S711 is executed. Note that, in this Step, whether or not there is a possibility of the rollback of the vehicle is to be determined. Then, the accelerator position=0 may be determined to be satisfied with approximately zero. An upper limit value for determining to be zero may be changed corresponding to the vehicle weight and the magnitude of the gradient. For example, the upper limit value may be increased as the vehicle weight or the gradient increases.

In Step S705, the state of the flg2 is determined. In the case of the flg2=1, the vehicle is determined to be during the rollback, and a process of Step S708 is executed. In the case of the flg2=0, the vehicle is determined not to be in the rollback, and a process of Step S706 is executed.

Step S706 is a process performed after the determination of the rollback not to have occurred in Step S705, and is a step for determining whether or not the rollback has started. Specifically, it is determined whether or not a motor rotation speed absolute value |ωm|>a motor rotation speed ωm1 is satisfied. The motor rotation speed ωm1 is predetermined through an experiment or the like, and is the motor rotation speed capable of determining that the vehicle has started the rollback. When |ωm|>ωm1 is satisfied, a process of Step S707 is executed, and in the case of not being satisfied, a process of Step S711 is executed.

In Step S707, the controller 2 sets the flg2=1 because the rollback is determined to have started in Step S706. After setting, the process of Step S711 is executed.

In Step S708, the state of the rollback is determined. In the case of the timer 1=0, or when the motor rotation speed absolute value |ωm|<a motor rotation speed ωm2 is satisfied, the rollback of the vehicle is determined to be reduced, and the process of Step S710 is executed. The motor rotation speed ωm2 is predetermined through an experiment or the like, and is a motor rotation speed capable of determining that the vehicle has stopped. When both the timer 1=0 and |ωm|<ωm2 are not satisfied, the vehicle is determined to be during the rollback, and a process in Step S709 for performing a countdown process of the timer 1 is executed.

In Step S710, the controller 2 sets the flg1 to 0 to return from the control parameter on the initial start to the control parameter during normal running.

In Step S709, the count value of the timer 1 is subtracted by one. That is, during the rollback, the count value of the timer 1 is counted down for each operation period until the rollback is determined to be reduced in Step S708. After the countdown, the process of Step S711 is executed.

In Step S711, the state of the FIG. 1 is determined to determine the control parameter to be set. In the case of the flg1=1, the process of Step S712 for setting the control parameter on the initial start is executed. In the case of the flg1=0, the control parameter for the motor torque control is set to the control parameter during normal running, and the initial start process terminates.

Figure 11:
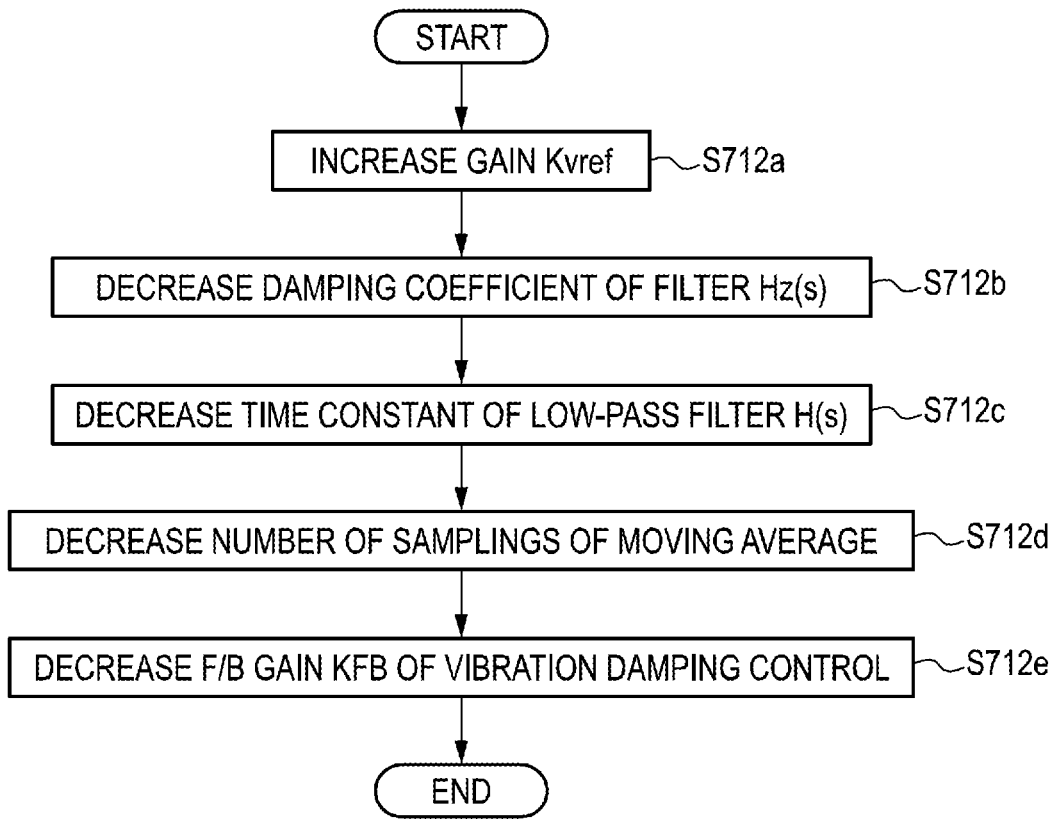
FIG. 11 is a flow of processes for setting of control parameters performed during the initial start process.

Subsequently, a description will be given of the setting of the control parameter on the initial start executed in Step S712. FIG. 11 is a flowchart illustrating a flow of the processes related to the setting of the control parameter on the initial start.

In Step S712a, the controller 2 sets the gain Kvref of the motor rotation speed F/B torque setting device 601 illustrated in FIG. 6 to a large value compared with during normal running including just before stop of the vehicle in a speed feedback control system that performs feedback of the motor rotation speed. This increases the motor rotation speed F/B torque Tω on the initial start, thus ensuring the motor torque command value Tm* to be more promptly converged to the disturbance. Consequently, after the initial start, the responsiveness of the motor torque to the disturbance acting on the vehicle increases, thus the distance of the rollback ensures being reduced.

The gain Kvref may be increased as the disturbance torque estimated value Td becomes large. This ensures the effect reducing the rollback distance of the vehicle to be maintained at equal to or more than a certain level even if the disturbance acting on the vehicle increases. A most dominant disturbance factor that influences the rollback distance is the road surface gradient. Accordingly, the gradient of the road surface on which the vehicle stops may be detected by gradient detecting means 12 (see FIG. 1) such as a gradient sensor, so as to increase the gain Kvref as the road surface gradient increases.

In Step S712b, a damping coefficient ζc of a denominator of the filter Hz(s) illustrated in FIG. 7, which is included in the disturbance torque estimator 502 illustrated in FIG. 5, is set small compared with during normal running. This ensures the disturbance torque estimated value Td to be promptly matched with the gradient disturbance while acceleration vibration of approximately 1 Hz is generated. Consequently, the responsiveness of the motor torque to the disturbance increases, thus the rollback distance can be reduced.

The damping coefficient ζc of the denominator of the filter Hz(s) may be decreased as the disturbance torque estimated value Td increases. This ensures the effect reducing the rollback distance of the vehicle to be maintained at equal to or more than a certain level even if the disturbance acting on the vehicle increases. The gradient of the road surface on which the vehicle stops may be detected, so as to decrease the damping coefficient ζc of the denominator of the filter Hz(s) as the road surface gradient increases.

In Step S712c, the time constant of the low-pass filter H(s) indicated by the control block 702, which is included in the disturbance torque estimator 502, is set to a small value compared with during normal running. This ensures the disturbance torque estimated value Td to be more promptly matched with the gradient disturbance of the road surface on which the vehicle is to stop. Consequently, the responsiveness of the motor torque to the disturbance increases, thus the rollback distance can be reduced.

The time constant of the low-pass filter H(s) may be decreased as the disturbance torque estimated value Td increases. This ensures the effect reducing the rollback distance of the vehicle to be maintained at equal to or more than a certain level even if the disturbance acting on the vehicle increases. The gradient of the road surface on which the vehicle stops may be detected, so as to decrease the time constant of the low-pass filter H(s) as the road surface gradient increases.

In Step S712d, the number of samplings of the motor rotation speed, which is related to a moving averaging process of the motor rotation speed ωm used in the stop control process of Step S204 and the vibration damping control process of Step S205 in FIG. 2, is decreased compared with during running. This ensures reducing the dead time in detecting the motor rotation speed. Since the variation of the motor is ordinarily vary little immediately after the initial start, the noise caused by detecting the rotation angle and the speed of the motor is low, and a booming noise or the like does not occur even if the number of the moving averaging processes is decreased. Accordingly, the stability of the control is ensured even if the dead time in detecting the motor rotation speed is reduced to increase the responsiveness.

In Step S712e, the feedback gain $K_{FB}$ (see the gain compensator 907 in FIG. 9) used in the vibration damping control process performed in Step S205 is set to a small value compared with during running. This ensures reducing overshooting of the F/B compensation torque $T_{F/B}$ (vibration damping torque) to the torque target value, thus ensuring the stability of the motor torque control.

As described above, after determining the initial start, the control parameter on the motor torque control is set to the control parameter on the initial start through the processes of Steps S712a to S712e. The order of Steps S712a to S712e is not limited to this. It is not necessarily required to execute all of Steps S712a to S712e, and simply at least one of Steps S712a to S712d is executed.

The detail of the initial start process has been described above. Here, a description will be given of a reason to increase the responsiveness of the motor torque only on the initial start.

During normal running of the vehicle, because of the influence of the noise caused by detecting the rotation angle and the speed r, a high frequency torque component (for example, a vibrational component in a band of 25 to 150 Hz) is sometimes output. The vibrational component is transmitted to a body chassis from a motor unit, a drive shaft, or similar unit via mounts or the like, so as to cause the booming noise. In view of this, when the quick responsiveness of the control parameter for the motor torque control is increased during normal running, the high frequency gain simultaneously increases, so as to significantly cause the booming noise. That is, the setting of the control parameter with the increased quick responsiveness is in the trade-off relationship with the booming noise.

On the other hand, on the initial start of the vehicle, the speed is not so high as during normal running, thus the high frequency noise caused by detecting the rotation angle and the speed of the motor hardly occurs compared with during not mal running. That is, on the initial start, the setting of the control parameter with the increased quick responsiveness hardly generates the booming noise as during normal running. Accordingly the control device for the electric vehicle of this embodiment sets the control parameter with the increased quick responsiveness only on the initial start where there is a little need to consider the problem of the booming noise, separately from the control parameter related to the stop control during normal running.

Figure 12:
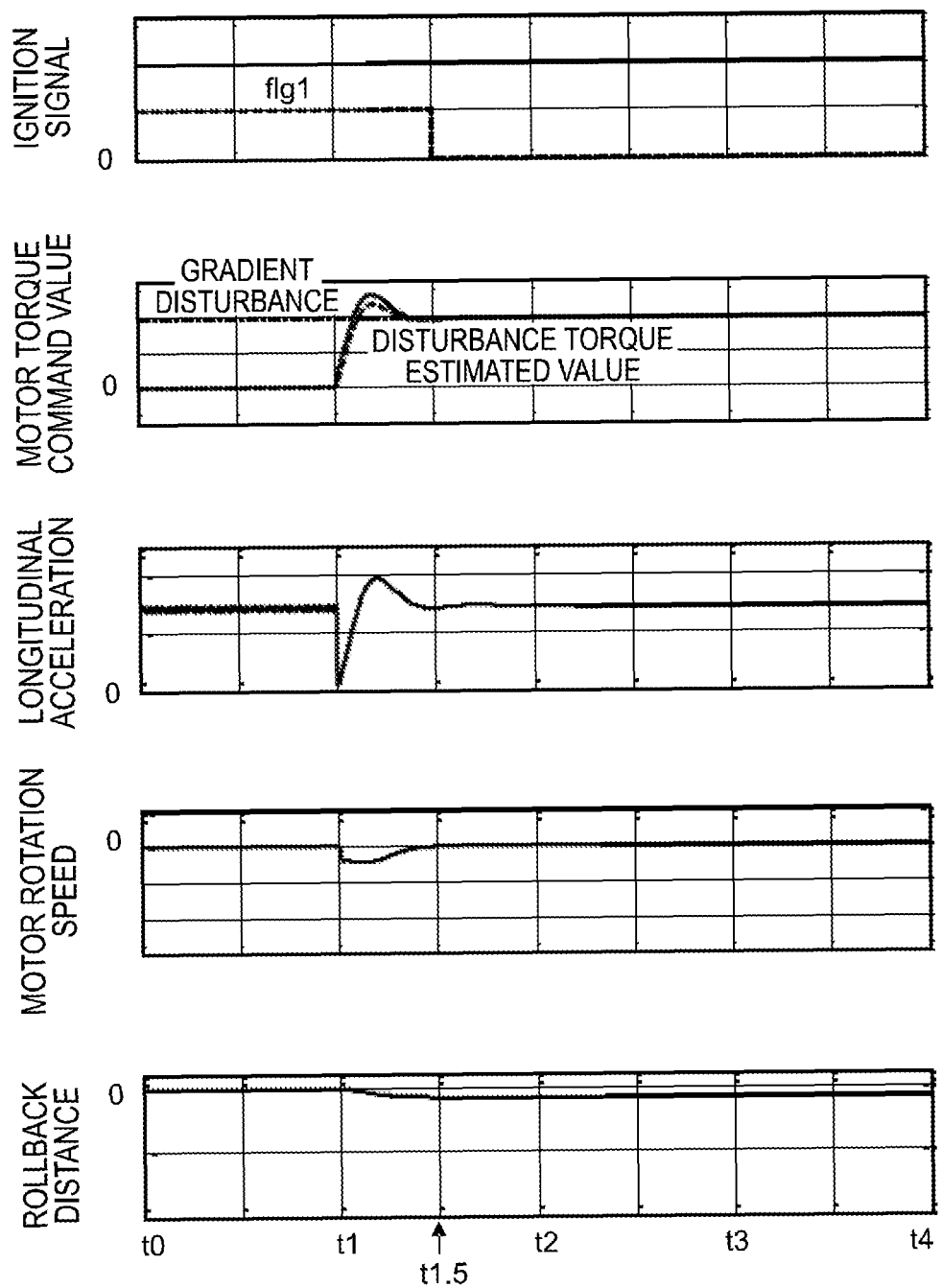
FIG. 12 is a diagram illustrating an exemplary control result by the control device for the electric vehicle in the first embodiment.
Figure 13:
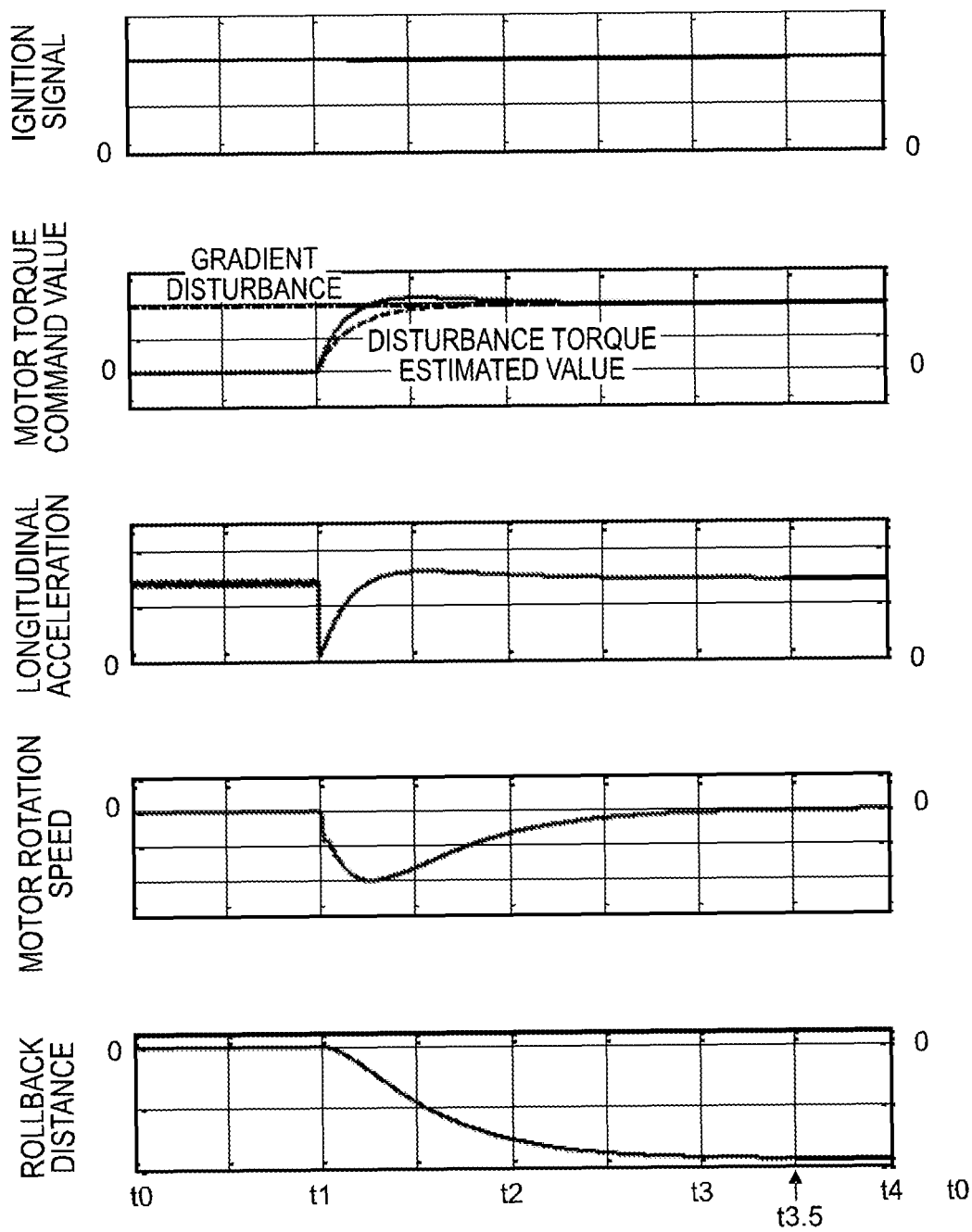
FIG. 13 is a diagram illustrating an exemplary control result by a comparative example.

The following describes the effects of the control device for the electric vehicle according to the embodiment applied to an electric vehicle, especially on the control on the initial start with reference to FIG. 12 and FIG. 13.

FIG. 12 is a diagram illustrating an exemplary control result by the control device for the electric vehicle according to the embodiment. FIG. 12 indicates the control result in a case of the initial start from a state of stop on an uphill road with a certain gradient, in an order from the top, the ignition signal, the motor torque command value, a vehicle longitudinal acceleration, the motor rotation speed, and the rollback distance. A dotted line in the diagram indicating the ignition signal indicates a state of the flg1. A dotted line in the diagram indicating the motor torque command value indicates the disturbance torque estimated value, and a one dot chain line indicates the gradient disturbance.

At a time t0, the ignition signal detected in Step S201 in FIG. 2 has transitioned from OFF to the ON state. Then, setting the flg1 to 1 in the process of Step S203 configures the control parameter to have the quick responsiveness of the motor torque control increased compared with during normal running (see Steps S712a to S712e). At this time, while the road surface gradient on which the vehicle stops is uphill, both the disturbance torque estimated value and the motor torque command value are initialized to 0. Accordingly, as seen from the diagram indicating the motor torque command value, the disturbance torque estimated value deviates from the gradient disturbance. At the time t0, a friction brake maintains the vehicle stop state on the uphill road.

At a time t1, braking by the friction brake is released. At this time, because of the flg1=1, the stop control process of Step S204 is set to the control parameter on the initial start. Accordingly, the motor torque command value is adjusted by the stop control process based on the control parameter having the increased quick responsiveness compared with during normal running. On the other hand, the vehicle where the friction brake braking is released starts the rollback.

Between the times t1 and t2, after the determination of the rollback state with the motor rotation speed absolute value |ωm| larger than the predetermined motor rotation speed ωm1, when the motor rotation speed absolute value |ωm| is determined to have converged to the value smaller than the predetermined motor rotation speed ωm2 in Step S708 in FIG. 7, the flg1 is set to 0 and the control parameter is returned to the setting value of the control parameter during normal running. From the diagram, at a time point of a t1.5, it is seen that the motor rotation speed has converged to zero and the rollback has stopped.

After the time t2, it is seen that the motor rotation speed has converged to 0 and the vehicle stop state is maintained by the stop control process based on the control parameter during normal running.

Next, as a comparative example, a description will be given of a control result in the case where the control parameter with the increased quick responsiveness is not set on the initial start with reference to FIG. 13.

At a time t0, the ignition signal detected in Step S201 in FIG. 2 has transitioned from OFF to the ON state. While the road surface gradient on which the vehicle stops is uphill, both the disturbance torque estimated value and the motor torque command value are initialized to 0. Accordingly, as seen from the diagram indicating the motor torque command value, the disturbance torque estimated value deviates from the gradient disturbance. At the time t0, a friction brake maintains the vehicle stop state on the uphill road.

At a time t1, braking by the friction brake is released. In this comparative example, the motor torque command value is calculated by the stop control process based on the control parameter identical to during normal running. As seen from the diagram, the vehicle where the friction brake is released starts the rollback.

While, after the release of the friction brake, the motor torque command value is adjusted by the stop control process based on the control parameter identical to during normal running, the motor torque command value in this example has not yet matched the gradient disturbance at a time point of a time t2. Therefore, the rollback distance also continues to extend even at a time t3, and the vehicle finally stops at a time point of a t3.5.

At a time t4, the motor rotation speed converges to 0, and the stop control process maintains the vehicle stop state. Note that, it is seen that a time period before maintaining the vehicle stop and the rollback distance are long compared with the stop control process based on the control parameter on the initial start described with reference to FIG. 13.

Thus, the control device for the electric vehicle according to the present invention reduces the time period taking for matching the disturbance torque estimated value with the gradient disturbance and controlling the motor torque to maintain the vehicle stop and the rollback distance compared with the conventional example.

As described above, the control device for the electric vehicle of the first embodiment is a control device for an electric vehicle including the motor that generates the driving torque and the regenerative torque corresponding to the accelerator operation by the driver. The control device for the electric vehicle determines whether or not the starting operation of the vehicle has been performed by the driver, calculates the disturbance torque estimated value Td necessary for maintaining the vehicle stop state corresponding to the disturbance acting on the vehicle, and performs a control such that the driving torque of the motor converges to the disturbance torque estimated value Td when the vehicle is determined to be just before stop of the vehicle during running or determined to have undergone the starting operation. Then, the control device for the electric vehicle controls the responsiveness of the driving torque to the disturbance acting on the vehicle, and increases the responsiveness of the driving torque of the motor compared with the responsiveness of the driving torque just before stop of the vehicle when the starting operation is determined to have been performed.

Accordingly, on the initial start of the vehicle, the responsiveness of the motor torque especially to the gradient disturbance ensures being increased compared with during normal running, thus the rollback distance of the vehicle that occurs when, for example, a brake braking force is released can be reduced. The driver is prevented from having an anxiety caused by the occurrence of the rollback.

The control device for the electric vehicle of the first embodiment determines that the vehicle starting operation has been performed when the control device for the electric vehicle detects the transition of the ignition switch signal of the vehicle from the OFF state to the ON state. This ensures reliable determination on the initial start of the vehicle.

The control device for the electric vehicle of the first embodiment uses the speed feedback control system that performs the feedback of the detected motor rotation speed ωm so as to calculate the disturbance torque estimated value. When the starting operation is determined to have been performed, the control device for the electric vehicle increases the feedback gain Kvref of the speed feedback control system to increase the responsiveness of the driving torque. Thus, the control device for the electric vehicle of this embodiment increases the quick responsiveness of the disturbance torque estimated value Td to the gradient disturbance corresponding to the gain Kvref on performing the feedback of the motor rotation speed ωm, so as to increase the responsiveness of the motor torque to the gradient disturbance. Accordingly, the responsiveness of the motor torque ensures being easily changed between during normal running and on the initial start, thus the responsiveness control is easily executed corresponding to the running situation of the vehicle.

The control device for the electric vehicle of the first embodiment includes the filter Hz(s) having the predetermined damping coefficient constituted of a quadratic expression as a numerator and a quadratic expression as a denominator, and calculates the disturbance torque estimated value Td on the basis of the damping coefficient of the filter. When the vehicle starting operation is determined to have been performed, the damping coefficient ζc of the denominator of the filter Hz(s) is decreased to increase the responsiveness of the driving torque. Thus, the control device for the electric vehicle of this embodiment increases the quick responsiveness of the disturbance torque estimated value Td to the gradient disturbance corresponding to the damping coefficient ζc of the denominator of the filter Hz(s) so as to increase the responsiveness of the motor torque to the gradient disturbance. Accordingly, the responsiveness of the motor torque ensures being easily changed between during normal running and on the initial start, thus the responsiveness control is easily executed corresponding to the running situation of the vehicle.

The control device for the electric vehicle of the first embodiment includes the filter H(s) having the predetermined time constant, and calculates the disturbance torque estimated value Td on the basis of the time constant of the filter. When the vehicle starting operation is determined to have been performed, the time constant is decreased to increase the responsiveness of the driving torque. Thus, the control device for the electric vehicle of this embodiment increase the quick responsiveness of the disturbance torque estimated value Td to the gradient disturbance corresponding to the time constant of the low-pass filter H(s), so as to increase the responsiveness of the motor torque to the gradient disturbance. Accordingly, the responsiveness of the motor torque ensures being easily changed between during normal running and on the initial start, thus the responsiveness control is easily executed corresponding to the running situation of the vehicle.

The control device for the electric vehicle of the first embodiment uses the speed feedback control system that performs the feedback of the values on which the moving average based on the predetermined number of samplings is applied to the detected motor rotation speed ωm, so as to calculate the disturbance torque estimated value Td. When the vehicle starting operation is determined to have been performed, the number of the samplings is decreased to increase the responsiveness of the driving torque. The control device for the electric vehicle of this embodiment decreases the number of the samplings of the motor rotation speed ωm on the moving averaging process performed in the calculation of the motor rotation speed ωm, so as to reduce the dead time caused by the delay of detecting the motor rotation speed ωm. Then, the stability of the control is ensured even if the quick responsiveness of the disturbance torque estimated value Td to the gradient disturbance is increased.

Furthermore, the control device for the electric vehicle of the first embodiment executes the vibration damping control process that causes the motor to generate the vibration damping torque for reducing the vibration generated on the vehicle body. The vibration damping control process uses the feedback control system to calculate the F/B compensation torque $T_{F/B}$ (the vibration damping torque), and when the vehicle starting operation is determined to have been performed, the feedback gain $K_{FB}$ of the feedback control system is set smaller than the feedback gain $K_{FB}$ just before stop of the vehicle. Thus, the control device for the electric vehicle of this embodiment sets the feedback gain $K_{FB}$ used in the vibration damping control process to a small value compared with during running, so as to reduce the overshooting of the F/B compensation torque $T_{F/B}$ (the vibration damping torque) to the torque target value. Then, the stability of the control is ensured even if the quick responsiveness of the disturbance torque estimated value Td to the gradient disturbance is increased.

When the absolute value of the detected value of the motor rotation speed ωm increases to equal to or more than a predetermined first rollback determination value ωm1, and subsequently decreases to equal to or less than a predetermined second rollback determination value ωm2, the control device for the electric vehicle of the first embodiment decreases the responsiveness of the driving torque increased when the vehicle starting operation is determined to have been performed to equivalent to the responsiveness of the driving torque during normal running. Alternatively, after a lapse of the predetermined time period (the timer count value T1) since the vehicle starting operation is determined to have been performed, the control device for the electric vehicle of the first embodiment decreases the responsiveness of the driving torque to equivalent to the responsiveness of the driving torque during normal running. Thus, the control device for the electric vehicle of this embodiment increases only the responsiveness at the beginning of the vehicle start immediately after the initial start, thus ensuring the reduction of the rollback on the initial start. At the same time, after on the initial start, the responsiveness is adjusted to appropriate responsiveness where the overshooting does not increase, thus ensuring the stability of the control during normal running.

The control device for the electric vehicle of the first embodiment further includes the gradient detecting means 12 that detects the gradient of the road surface on which the vehicle stops, so as to increase the responsiveness of the driving torque as the detected gradient becomes large. This ensures promptly rising the disturbance torque estimated value Td even if, for example, on a steep gradient, thus reducing the rollback of the vehicle.

Second Embodiment

The following describes a control device for an electric vehicle of a second embodiment. The control device for the electric vehicle of the second embodiment is different from the control device for the electric vehicle of the first embodiment described above especially on the setting timing of the control parameter on the initial start in the initial start process.

For the setting timing of the control parameter on the initial start, in the first embodiment, setting the flg1 to 1 when the ignition signal is confirmed to have transitioned from the OFF state to the ON state causes the control parameter on the initial start to be set in the process of Step S712. That is, the first embodiment has the configuration where, when the driver turns the initial start switch ON to activate the vehicle system, the vehicle is determined to be on the initial start, thus the control parameter on the initial start is immediately set.

Figure 14:
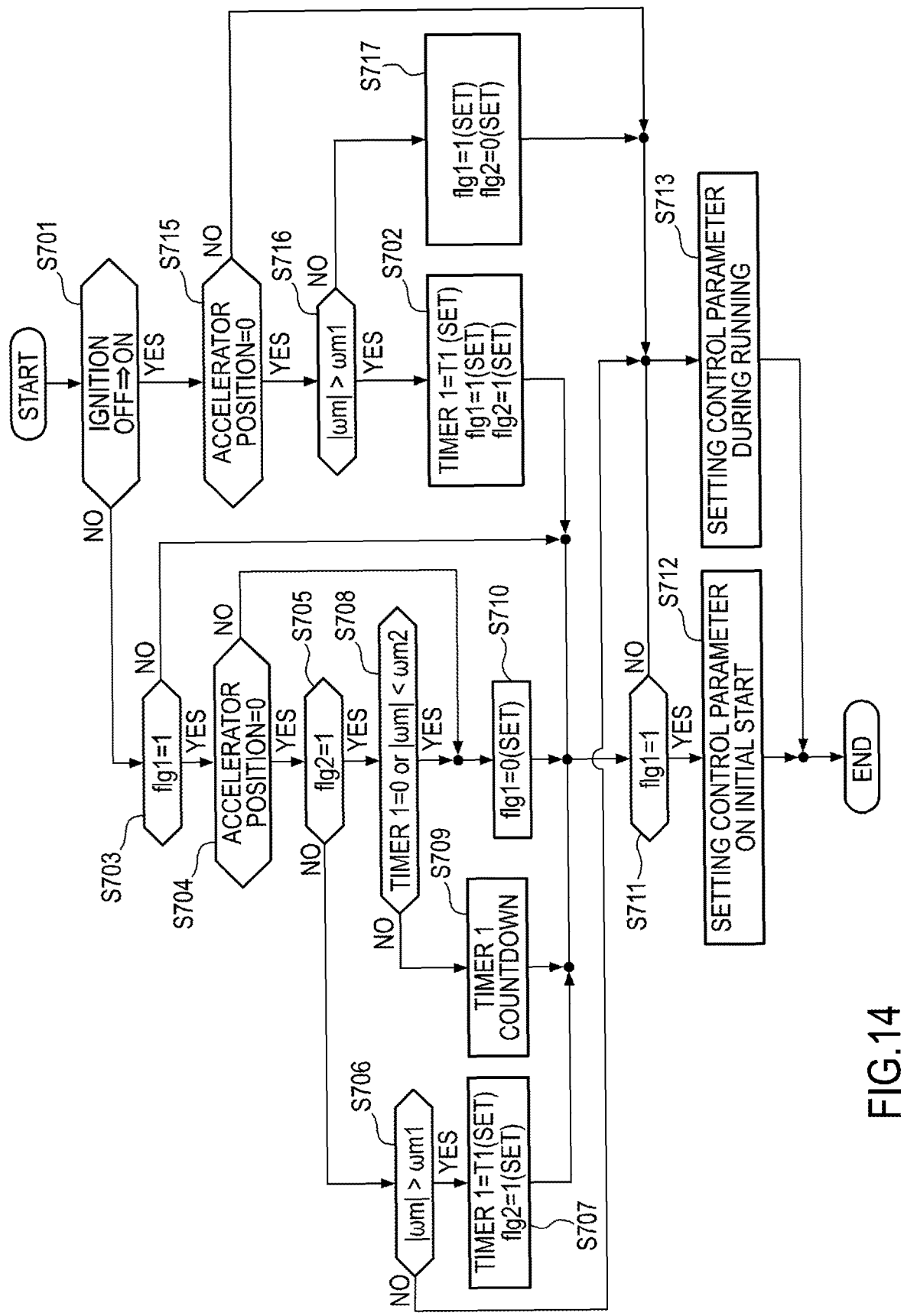
FIG. 14 is a flow of an initial start process performed by a motor controller provided with a control device for an electric vehicle in a second embodiment.

In this embodiment, in addition to confirming the transition of the ignition signal from the OFF state to the ON state, the controller 2 sets the flg1 to 1 when the accelerator position is confirmed to be zero. Furthermore, when the absolute value of the motor rotation speed increases to equal to or more than the predetermined value and the rollback is detected to start, the controller 2 determines the vehicle to be on the initial start, thus setting the control parameter on the initial start. The following describes an initial start process in this embodiment in detail with reference to FIG. 14.

In Step S701, the controller 2 determines whether or not the ignition switch signal has transitioned from OFF to the ON state. When the ignition switch signal has transitioned from OFF to ON, the controller 2 executes a process of Step S715. When the ignition switch signal stays at the ON state, the controller 2 executes the process of Step S703.

In Step S715, the controller 2 determines whether or not the accelerator position is zero, that is, whether or not the accelerator operation by the driver has been performed. When the accelerator position is zero, that is, the accelerator operation by the driver has not been performed, a process of Step S716 is executed. When the accelerator position is not zero and the driver is pressing the accelerator pedal, the process of Step S713 is executed. When the driver is pressing the accelerator pedal, the rollback of the vehicle basically does not occur, thus the controller 2 sets the control parameter during normal running in Step S713 so as to terminate the initial start process.

In Step S716, the controller 2 determines whether or not the rollback has started. Specifically, it is determined whether or not the vehicular motor rotation speed absolute value |ωm| is larger than the motor rotation speed ωm1 as a comparative value. The motor rotation speed ωm1 is predetermined through an experiment or the like, and is the motor rotation speed capable of determining that the vehicle has started the rollback. The value of the vehicular motor rotation speed for comparison uses the absolute value for ensuring collectively detecting both a case where the vehicle slides down backward on an uphill and a case where the vehicle slides down forward on a downhill. When |ωm|>ωm1 is satisfied, the process of Step S702 is executed. When |ωm|>ωm1 is not satisfied, a process of Step S717 is executed.

In Step S702, the controller 2 sets each of the timer 1, the flg1, and flg2. The value set on the timer 1 is a time period from the determination that the ignition switch signal has become in the ON state and the vehicle has started the rollback, and the gradient disturbance matches the disturbance torque estimated value Td calculated by the controller 2, until the motor torque is controlled with the motor torque command value Tm* to hold the vehicle stop state. The value set on the timer 1 is a value preliminarily adapted through an experiment or the like.

Then, the controller 2 sets the flg1 and the flg2 to 1. The flg1=1 in this embodiment indicates that the ignition signal has transitioned from OFF to the ON state and the accelerator position is zero. The flg2=1 indicates, similarly to the first embodiment, that the vehicle has started the rollback. In this embodiment, the flg1=1 and the flg2=1 are set to indicate that the vehicle is on the initial start. After the settings, the controller 2 executes the process of S711.

In S711, whether or not the flg=1 is satisfied is determined. In the process of S702, the flg is set to 1, thus the controller 2 executes the process of Step S712 as the following Step.

In Step S712, the control parameter on the initial start is set as the control parameter used in the calculation of the disturbance torque estimated value Td. The setting of the control parameter on the initial start is executed similarly to the first embodiment (see FIG. 11). After the control parameter on the initial start is set, the initial start process terminates.

Next, a description will be given of the flow in the case where $|\omega m|>\omega m1$ is not satisfied in Step S716. In Step S717, since the ignition signal has transitioned from OFF to the ON state and the accelerator position is zero, the controller 2 sets the flg1 to 1. Since $|\omega m|>\omega m1$ is not satisfied and the vehicle has not yet started the rollback, the flg2 is set to 0. After the settings, the controller 2 executes the process of S713.

In Step S713, the control parameter during normal running is set as the control parameter used in the calculation of the disturbance torque estimated value Td. After the control parameter during normal running is set, one cycle of the initial start process terminates.

Then, on the execution of the process of S701 in the next cycle, the ignition switch signal stays at the ON state, thus the controller 2 executes the process of Step S703.

In Step S703, the controller 2 determines the state of the flg1. In Step S717 in the previous cycle, the flg1 is set to 1, thus a process of Step S704 is subsequently executed.

In Step S704, the controller 2 determines whether or not the accelerator position is zero. When the accelerator position is zero, the process of Step S705 is executed to determine whether or not the rollback of the vehicle has started. When the accelerator position is not zero, that is, when the driver is pressing the accelerator pedal, the vehicle is determined to have transitioned to a state of running corresponding to the intention of the driver, for example, starting to accelerate, and to have gotten out of being on the initial start, thus the flg is set to 0 in Step S710. Then, in Step S713, the controller 2 sets the control parameter during normal running as the control parameter used in the calculation of the disturbance torque estimated value Td, thus the initial start process terminates.

In Step S704, similarly to the first embodiment, the past value Tm1_z of the first torque target value Tm1* may be compared with the past value Tm2_z of the second torque target value Tm2*. When Tm2_z>Tm1_z is satisfied, the process of Step S705 is executed. When Tm2_z>Tm1_z is not satisfied, the vehicle is determined to have started the running corresponding to the intention of the driver, and the flg is set to 0 in Step S710. Subsequently, the process of Step S711 is executed.

Next, a description will be given of the flow in the case where the controller 2 determines the accelerator position=0 in Step S704. In the case of the accelerator position=0, the controller 2 executes the process of S705 and determines the state of the flg2. The vehicle on this time point has not yet started the rollback, so as to be the flg2=0. Accordingly, the controller 2 subsequently executes the process of Step S706.

In Step S706, the controller 2 determines whether or not the motor rotation speed absolute value $|\omega m|>$ the motor rotation speed $\omega m1$ is satisfied for determining whether or not the vehicle has started the rollback. As described above, the motor rotation speed $\omega m1$ is a motor rotation speed capable of determining that the vehicle has started the rollback, and a value predetermined through an experiment or the like. When $|\omega m|>\omega m1$ is not satisfied, the vehicle has not yet started the rollback. Then, the controller 2 sets the control parameter during normal running in Step S713, and terminates the initial start process. When $|\omega m|>\omega m1$ is satisfied, a process of Step S707 is executed.

In Step S707, since $|\omega m|>\omega m1$ is satisfied and the vehicle is determined to have started the rollback, the flg2 is set to 1 and the count value T1 is set on the timer 1. Then, the controller 2 determines the state of the flg1 in the following Step S711. The count value T1 is a time period from the determination of the vehicle to have started the rollback and to be on the initial start to holding the vehicle stop state after. The count value T1 is a value preliminarily adapted through an experiment or the like.

In Step S711, since the state where the flg1 is set to 1 in the process of Step S717 continues, the flg1=1 is satisfied. Accordingly, the controller 2 sets the control parameter on the initial start in the following Step S712, and terminates the initial start process.

On this time point, the flg1, the flg2, and the timer 1 have been set to the flg1=1, the flg2=1, and the timer 1=T1, respectively. On this premise, the initial start process in the next cycle will be described.

As described above, since the flg1=1 and the flg2=1 are set, insofar as the accelerator position=0 is satisfied in Step S704, the controller 2 executes the process of Step S708. When the accelerator position=0 is not satisfied, the controller 2 determines the vehicle to have started the running corresponding to the intention of the driver and to have gotten out of being on the initial start. Then, the controller 2 sets the flg to 0 in Step S710, and sets the control parameter during normal running in Step S713. After the setting, the initial start process terminates.

In Step S708, the state of the rollback is determined. In the case of the timer 1=0, or in the case where the motor rotation speed absolute value $|\omega m|<$the motor rotation speed $\omega m2$ is satisfied, the rollback of the vehicle is determined to be reduced, and the process of Step S710 is executed. The motor rotation speed $\omega m2$ is predetermined through an experiment or the like, and is a motor rotation speed capable of determining that the vehicle has started the rollback. When both the timer 1=0 and $|\omega m|<\omega m2$ are not satisfied, the vehicle is determined to be during the rollback. Then, the process of Step S709 for performing the countdown process of the timer 1 is executed.

In Step S709, the count value of the timer 1 is subtracted by one. That is, during the rollback, the count value of the timer 1 is counted down for each operation period until the count value of the timer 1 comes to zero or $|\omega m|<\omega m2$ is satisfied before the rollback is determined to be reduced in Step S708. Then, when any one of the timer 1=0 and $|\omega m|<\omega m2$ is satisfied in Step S708, the controller 2 sets the control parameter during normal running and terminates the initial start process.

As described above, the control device for the electric vehicle of the second embodiment determines that the vehicle starting operation has been performed when the control device for the electric vehicle detects the transition of the ignition switch signal of the vehicle from the OFF state to the ON state, the accelerator position is zero, and the absolute value of the motor rotation speed $\omega m$ is equal to or more than the predetermined value $\omega m1$. This ensures the execution of the setting of the control parameter with the increased responsiveness only on the timing where the rollback of the vehicle is started. Accordingly, on a road surface where the rollback inherently does not occur, such as a flat road, the setting of the control parameter during normal running is performed even if the ignition switch signal transitions from OFF to the ON state. Then, the execution of the setting of the control parameter on the initial start is ensured on more appropriate timing suitable for the object to reduce the distance of the rollback.

The present invention is not limited to the above-described embodiments but various modifications and applications are possible. For example, the above-described explanation describes that the motor torque command value Tm* is converged to the disturbance torque command value Td as the rotation speed of the electric motor 4 decreases. However, a speed parameter such as a wheel speed, a vehicle body speed, and a rotation speed of the drive shaft has a proportional relation with the rotation speed of the electric motor 4. Then, the motor torque command value Tm* may be converged to the disturbance torque estimated value Td as the speed parameter proportional to the rotation speed of the electric motor 4 decreases.

While the explanation is given that the control parameter on the initial start is set to increase the responsiveness of the motor torque, there is sometimes a case where, on an unstable road surface with a low road-surface friction coefficient, for example, an icy road surface and a snow-covered road, the increased responsiveness causes the overshooting to increase, thus it is difficult to maintain the stability of the control. Accordingly, the road-surface friction coefficient and the like may be detected so as to inhibit the increase of the responsiveness of the motor torque depending on the road surface condition.

In the control device for the electric vehicle according to the present invention, a microphone and a camera may be further disposed to detect the vehicle starting operation by the driver.

Furthermore, in the above description, the disturbance torque estimated value on the initial start is initialized to a predetermined value (for example, equivalent to a flat road) during stopping of the vehicle system. However, not necessarily limited to this, the disturbance torque estimated value during stopping may be stored in a memory so as to set the disturbance torque estimated value on the initial start to the stored disturbance torque estimated value. In this case, the motor torque command value on the initial start is controlled so as to be converged to the disturbance torque estimated value stored during stopping of the vehicle system.

The invention claimed is:

1. A control device for an electric vehicle, the electric vehicle including a motor that generates a driving torque and a controller that controls the motor, the controller configured to:
   determine whether an initial start operation of a vehicle has been performed by a driver, the initial start operation being not performed with an accelerator operation;
   calculate a disturbance torque estimated value necessary for maintaining a vehicle stop state corresponding to a disturbance acting on the vehicle;
   perform a control such that the driving torque of the motor converges to the disturbance torque estimated value when the vehicle is determined to be just before stop of the vehicle during running or determined to have undergone the initial start operation; and
   increase, when the initial start operation is determined to have been performed, the responsiveness of the driving torque of the motor compared with a responsiveness of the driving torque just before the stop of the vehicle.

2. The control device for the electric vehicle according to claim 1, wherein the controller is configured to:
   determines that determine the initial start operation has been performed when the controller detects a transition of an ignition switch signal of the vehicle from an OFF state to an ON state.

3. The control device for the electric vehicle according to claim 2, wherein the controller is configured to:
   obtain an accelerator position by the driver,
   obtain a motor rotation speed or a speed parameter proportional to the motor rotation speed, and
   determine that the initial start operation has been performed when the controller detects a transition of the ignition switch signal of the vehicle from the OFF state to the ON state, the amount of the accelerator operation is zero, and the absolute value of the motor rotation speed or an absolute value of the speed parameter is equal to or more than a predetermined value.

4. The control device for the electric vehicle according to claim 1, wherein the controller is configured to:
   obtain a motor rotation speed or a speed parameter proportional to the motor rotation speed,
   use a speed feedback control system that performs a feedback of the obtained motor rotation speed or the speed parameter, so as to calculate the disturbance torque estimated value, and
   increase a feedback gain of the speed feedback control system when the initial start operation is determined to have been performed, so as to increase the responsiveness of the driving torque.

5. The control device for the electric vehicle according to claim 1, wherein the controller is configured to:
   include a filter having a predetermined damping coefficient constituted of a quadratic expression as a numerator and a quadratic expression as a denominator, and calculates the disturbance torque estimated value damped on the basis of the damping coefficient of the filter, and
   decrease a damping coefficient of the denominator of the filter when the initial start operation is determined to have been performed, so as to increase the responsiveness of the driving torque.

6. The control device for the electric vehicle according to claim 1, wherein the controller is configured to:
   include a low-pass filter having a predetermined time constant, and calculates the disturbance torque estimated value on the basis of the time constant of the low-pass filter, and
   decrease the time constant when the initial start operation is determined to have been performed, so as to increase the responsiveness of the driving torque.

7. The control device for the electric vehicle according to claim 1, wherein the controller is configured to:
   obtain a motor rotation speed or a speed parameter proportional to the motor rotation speed,
   use a speed feedback control system that performs a feedback of values on which a moving average based on a predetermined count of samplings is applied to the obtained motor rotation speed or the speed parameter, so as to calculate the disturbance torque estimated value, and
   decrease the predetermined count of the samplings when the initial start operation is determined to have been performed.

8. The control device for the electric vehicle according to claim 1, wherein the controller is configured to:
   cause the motor to generate a vibration damping torque for reducing vibration generated on a vehicle body as a vibration damping control processing, and in the vibration damping control processing, use a feedback control system to calculate the vibration damping torque, and sets a feedback gain of the feedback control system smaller than the feedback gain just before the stop of the vehicle when the initial start operation is determined to have been performed.

9. The control device for the electric vehicle according to claim 1, wherein the controller is configured to:
   obtain a motor rotation speed or a speed parameter proportional to the motor rotation speed,
   determine that the initial start operation has been performed when an absolute value of the obtained value of the motor rotation speed or the speed parameter increases to equal to or more than a predetermined first rollback determination value and subsequently decreases to equal to or less than a predetermined second rollback determination value, and
   decrease the increased responsiveness of the driving torque to equivalent to the responsiveness of the driving torque just before the stop of the vehicle when the initial start operation is determined to have been performed.

10. The control device for the electric vehicle according to claim 1, wherein the controller is configured to:
    decrease the responsiveness of the driving torque to equivalent to the responsiveness of the driving torque just before the stop of the vehicle after a lapse of a predetermined time period since the initial start operation is determined to have been performed.

11. The control device for the electric vehicle according to claim 1, wherein the controller is configured to:
    obtain a gradient of a road surface on which a vehicle stops, and
    increase the responsiveness of the driving torque as the gradient becomes large.

12. A control method for an electric vehicle, the electric vehicle including a motor that generates a driving torque and a controller that controls the motor, the control method for the electric vehicle comprising:
    determining, via the controller, whether an initial start operation of a vehicle has been performed by a driver, the initial start operation being not performed with an accelerator operation;
    calculating, via the controller, a disturbance torque estimated value necessary for maintaining a vehicle stop state corresponding to a disturbance acting on the vehicle;
    performing, via the controller, a control such that the driving torque of the motor converges to the disturbance torque estimated value when the vehicle is determined to be just before stop of the vehicle during running or determined to have undergone the initial start operation; and
    increasing, via the controller, a responsiveness of the driving torque of the motor compared with a responsiveness of the driving torque just before the stop of the vehicle when the initial start operation is determined to have been performed.

* * * * *